United States Patent
Bertness

(10) Patent No.: US 12,237,482 B2
(45) Date of Patent: Feb. 25, 2025

(54) INTELLIGENT MODULE INTERFACE FOR BATTERY MAINTENANCE DEVICE

(71) Applicant: Midtronics, Inc., Willowbrook, IL (US)

(72) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 0 days.

(21) Appl. No.: 18/609,344

(22) Filed: Mar. 19, 2024

(65) Prior Publication Data

US 2024/0222731 A1    Jul. 4, 2024

Related U.S. Application Data

(62) Division of application No. 17/136,600, filed on Dec. 29, 2020, now Pat. No. 11,973,202.
(Continued)

(51) Int. Cl.
| | |
|---|---|
| *H01M 10/48* | (2006.01) |
| *B60L 53/16* | (2019.01) |
| *B60L 53/62* | (2019.01) |
| *B60L 53/66* | (2019.01) |
| *H01M 50/569* | (2021.01) |

(52) U.S. Cl.
CPC ........... *H01M 10/486* (2013.01); *B60L 53/16* (2019.02); *B60L 53/62* (2019.02); *B60L 53/66* (2019.02); *H01M 50/569* (2021.01); *H01M 2220/20* (2013.01)

(58) Field of Classification Search
CPC ............ H01M 10/486; H01M 50/569; H01M 10/441; H01M 10/482; H01M 10/4207; B60L 53/16; B60L 53/62; B60L 53/66
See application file for complete search history.

(56) References Cited

U.S. PATENT DOCUMENTS

| | | | |
|---|---|---|---|
| 85,553 A | 1/1869 | Adams | 33/472 |
| 2,000,665 A | 5/1935 | Neal | 439/440 |

(Continued)

FOREIGN PATENT DOCUMENTS

| | | |
|---|---|---|
| CN | 2470964 Y | 1/2002 |
| CN | 201063352 Y | 5/2008 |

(Continued)

OTHER PUBLICATIONS

"Electrochemical Impedance Spectroscopy in Battery Development and Testing", *Batteries International*, Apr. 1997, pp. 59 and 62-63.
(Continued)

*Primary Examiner* — Stewart A Fraser
(74) *Attorney, Agent, or Firm* — Westman, Champlin & Koehler, P.A.

(57) ABSTRACT

The present invention includes a battery pack maintenance device for performing maintenance on battery packs of hybrid and/or electrical vehicles (referred herein generally as electric vehicles). In various embodiments, the device includes one or more loads for connecting to a battery pack for use in discharging the battery pack, and/or charging circuitry for use in charging the battery pack. Optional input/output circuitry can be provided for communicating with circuitry of in the battery pack and/or circuitry of the vehicle. A method and device for determining connector configuration is also provided.

12 Claims, 9 Drawing Sheets

Related U.S. Application Data

(60) Provisional application No. 62/955,805, filed on Dec. 31, 2019.

(56) References Cited

U.S. PATENT DOCUMENTS

| | | | |
|---|---|---|---|
| 2,254,846 A | 9/1941 | Heyer | 324/437 |
| 2,417,940 A | 3/1947 | Lehman | 200/61.25 |
| 2,437,772 A | 3/1948 | Wall | 324/523 |
| 2,514,745 A | 7/1950 | Dalzell | 324/115 |
| 2,727,221 A | 12/1955 | Springg | 340/447 |
| 3,025,455 A | 3/1962 | Jonsson | 323/369 |
| 3,178,686 A | 4/1965 | Mills | 340/447 |
| 3,215,194 A | 11/1965 | Sununu et al. | 165/80.3 |
| 3,223,969 A | 12/1965 | Alexander | 340/447 |
| 3,267,452 A | 8/1966 | Wolf | 340/249 |
| 3,356,936 A | 12/1967 | Smith | 324/429 |
| 3,562,634 A | 2/1971 | Latner | 324/427 |
| 3,593,099 A | 7/1971 | Scholl | 320/127 |
| 3,607,673 A | 9/1971 | Seyl | 324/425 |
| 3,652,341 A | 3/1972 | Halsall et al. | 29/623.2 |
| 3,676,770 A | 7/1972 | Sharaf et al. | 324/430 |
| 3,699,433 A | 10/1972 | Smith, Jr. | 324/523 |
| 3,704,439 A | 11/1972 | Nelson | |
| 3,729,989 A | 5/1973 | Little | 73/862.192 |
| 3,745,441 A | 7/1973 | Soffer | 290/14 |
| 3,750,011 A | 7/1973 | Kreps | 324/430 |
| 3,753,094 A | 8/1973 | Furuishi et al. | 324/430 |
| 3,776,177 A | 12/1973 | Bryant et al. | 116/311 |
| 3,796,124 A | 3/1974 | Crosa | 411/521 |
| 2,689,939 A | 4/1974 | Godshalk | |
| 3,808,401 A | 4/1974 | Wright et al. | |
| 3,808,522 A | 4/1974 | Sharaf | 324/430 |
| 3,808,573 A | 4/1974 | Cappell | |
| 3,811,089 A | 5/1974 | Strezelewicz | 324/170 |
| 3,816,805 A | 6/1974 | Terry | 320/123 |
| 3,850,490 A | 11/1974 | Zehr | 439/822 |
| 3,857,082 A | 12/1974 | Van Opijnen | 320/143 |
| 3,873,911 A | 3/1975 | Champlin | 324/430 |
| 3,876,931 A | 4/1975 | Godshalk | 324/429 |
| 3,879,654 A | 4/1975 | Kessinger | 324/434 |
| 3,886,426 A | 5/1975 | Daggett | 320/117 |
| 3,886,443 A | 5/1975 | Miyakawa et al. | 324/426 |
| 3,889,248 A | 6/1975 | Ritter | 340/636.11 |
| 3,906,329 A | 9/1975 | Bader | 320/134 |
| 3,909,708 A | 9/1975 | Champlin | 324/431 |
| 3,920,284 A | 11/1975 | Lane et al. | 303/122.06 |
| 3,936,744 A | 2/1976 | Perlmutter | 324/772 |
| 3,939,400 A | 2/1976 | Steele | 324/434 |
| 3,946,299 A | 3/1976 | Christianson et al. | 320/430 |
| 3,947,757 A | 3/1976 | Grube et al. | 324/416 |
| 3,969,667 A | 7/1976 | McWilliams | 324/427 |
| 3,979,664 A | 9/1976 | Harris | 324/397 |
| 3,984,762 A | 10/1976 | Dowgiallo, Jr. | 324/430 |
| 3,984,768 A | 10/1976 | Staples | 324/712 |
| 3,989,544 A | 11/1976 | Santo | 429/65 |
| 3,997,830 A | 12/1976 | Newell et al. | 320/102 |
| 4,008,619 A | 2/1977 | Alcaide et al. | 73/724 |
| 4,023,882 A | 5/1977 | Pettersson | 439/426 |
| 4,024,953 A | 5/1977 | Nailor, III | 206/344 |
| 4,045,718 A | 8/1977 | Gray | |
| 4,047,091 A | 9/1977 | Hutchines et al. | 363/59 |
| 4,053,824 A | 10/1977 | Dupuis et al. | 324/434 |
| 4,056,764 A | 11/1977 | Endo et al. | 320/101 |
| 4,057,313 A | 11/1977 | Polizzano | 439/219 |
| 4,070,624 A | 1/1978 | Taylor | 324/772 |
| 4,086,531 A | 4/1978 | Bernier | 324/772 |
| 4,106,025 A | 8/1978 | Katz | 343/715 |
| 4,112,351 A | 9/1978 | Back et al. | 324/380 |
| 4,114,083 A | 9/1978 | Benham et al. | 340/636.13 |
| 4,126,874 A | 11/1978 | Suzuki et al. | 396/301 |
| 4,160,916 A | 7/1979 | Papasideris | 307/10.6 |
| 4,176,315 A | 11/1979 | Sunnarborg | 324/133 |
| 4,178,546 A | 12/1979 | Hulls et al. | 324/772 |
| 4,193,025 A | 3/1980 | Frailing et al. | 324/427 |
| 4,207,610 A | 6/1980 | Gordon | 701/33.9 |
| 4,207,611 A | 6/1980 | Gordon | 701/33 |
| 4,217,645 A | 8/1980 | Barry et al. | 702/63 |
| 4,218,745 A | 8/1980 | Perkins | 324/66 |
| 4,280,457 A | 7/1981 | Bloxham | 123/198 R |
| 4,295,468 A | 10/1981 | Bartelt | |
| 4,297,639 A | 10/1981 | Branham | 324/429 |
| 4,307,342 A | 12/1981 | Peterson | 324/767 |
| 4,315,204 A | 2/1982 | Sievers et al. | 322/28 |
| 4,316,185 A | 2/1982 | Watrous et al. | 340/636.11 |
| 4,322,685 A | 3/1982 | Frailing et al. | 324/429 |
| 4,351,405 A | 6/1982 | Fields et al. | 180/65.2 |
| 4,352,067 A | 9/1982 | Ottone | 324/434 |
| 4,360,780 A | 11/1982 | Skutch, Jr. | 324/437 |
| 4,361,809 A | 11/1982 | Bil et al. | 324/426 |
| 4,363,407 A | 12/1982 | Buckler et al. | 209/3.3 |
| 4,369,407 A | 1/1983 | Korbell | 324/416 |
| 4,379,989 A | 4/1983 | Kurz et al. | 320/165 |
| 4,379,990 A | 4/1983 | Sievers et al. | 322/99 |
| 4,385,269 A | 5/1983 | Aspinwall et al. | 320/129 |
| 4,390,828 A | 6/1983 | Converse et al. | 320/153 |
| 4,392,101 A | 7/1983 | Saar et al. | 320/156 |
| 4,396,880 A | 8/1983 | Windebank | 320/156 |
| 4,408,157 A | 10/1983 | Beaubien | 324/712 |
| 4,412,169 A | 10/1983 | Dell'Orto | 320/123 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,425,791 A | 1/1984 | Kling | 73/116.02 |
| 4,441,359 A | 4/1984 | Ezoe | 73/116.06 |
| 4,459,548 A | 7/1984 | Lentz et al. | 324/472 |
| 4,484,140 A | 11/1984 | Dieu | |
| 4,502,000 A | 2/1985 | Mashikian | |
| 4,514,694 A | 4/1985 | Finger | 324/429 |
| 4,520,353 A | 5/1985 | McAuliffe | 340/636.16 |
| 4,521,498 A | 6/1985 | Juergens | 429/59 |
| 4,544,312 A | 10/1985 | Stencel | |
| 4,560,230 A | 12/1985 | Inglis | 439/890 |
| 4,564,798 A | 1/1986 | Young | 320/103 |
| 4,620,767 A | 11/1986 | Woolf | 439/217 |
| 4,626,765 A | 12/1986 | Tanaka | 320/127 |
| 4,633,418 A | 12/1986 | Bishop | 702/63 |
| 4,637,359 A | 1/1987 | Cook | 123/179 |
| 4,643,511 A | 2/1987 | Gawlik | 439/755 |
| 4,659,977 A | 4/1987 | Kissel et al. | 320/150 |
| 4,663,580 A | 5/1987 | Wortman | 320/153 |
| 4,665,370 A | 5/1987 | Holland | 324/429 |
| 4,667,143 A | 5/1987 | Cooper et al. | 320/153 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/165 |
| 4,686,442 A | 8/1987 | Radomski | 320/123 |
| 4,697,134 A | 9/1987 | Burkum et al. | 320/134 |
| 4,707,795 A | 11/1987 | Alber et al. | 702/63 |
| 4,709,202 A | 11/1987 | Koenck et al. | 320/112 |
| 4,710,861 A | 12/1987 | Kanner | 363/46 |
| 4,719,428 A | 1/1988 | Liebermann | 324/436 |
| 4,723,656 A | 2/1988 | Kiernan et al. | 206/705 |
| 4,743,855 A | 5/1988 | Randin et al. | 324/430 |
| 4,745,349 A | 5/1988 | Palanisamy et al. | 320/125 |
| 4,773,011 A | 9/1988 | VanHoose | 701/30 |
| 4,781,629 A | 11/1988 | Mize | 439/822 |
| D299,909 S | 2/1989 | Casey | D10/77 |
| 4,816,768 A | 3/1989 | Champlin | 324/428 |
| 4,820,966 A | 4/1989 | Fridman | 320/116 |
| 4,825,170 A | 4/1989 | Champlin | 324/436 |
| 4,826,457 A | 5/1989 | Varatta | 439/504 |
| 4,847,547 A | 7/1989 | Eng, Jr. et al. | 320/153 |
| 4,849,700 A | 7/1989 | Morioka et al. | 324/427 |
| 4,874,679 A | 10/1989 | Miyagawa | 429/91 |
| 4,876,495 A | 10/1989 | Palanisamy et al. | 320/106 |
| 4,881,038 A | 11/1989 | Champlin | 324/426 |
| 4,885,523 A | 12/1989 | Koench | 230/131 |
| 4,888,716 A | 12/1989 | Ueno | 702/63 |
| 4,901,007 A | 2/1990 | Sworm | 324/110 |
| 4,907,176 A | 3/1990 | Bahnick et al. | 364/551.01 |
| 4,912,416 A | 3/1990 | Champlin | 324/430 |
| 4,913,116 A | 4/1990 | Katogi et al. | 123/406.32 |
| 4,926,330 A | 5/1990 | Abe et al. | 701/33 |

(56) References Cited

U.S. PATENT DOCUMENTS

| | | | |
|---|---|---|---|
| 4,929,931 A | 5/1990 | McCuen | 340/636.15 |
| 4,931,738 A | 6/1990 | MacIntyre et al. | 324/435 |
| 4,932,905 A | 6/1990 | Richards | 439/822 |
| 4,933,845 A | 6/1990 | Hayes | 710/104 |
| 4,934,957 A | 6/1990 | Bellusci | 439/504 |
| 4,937,528 A | 6/1990 | Palanisamy | 324/430 |
| 4,947,124 A | 8/1990 | Hauser | 324/430 |
| 4,949,046 A | 8/1990 | Seyfang | 324/427 |
| 4,956,597 A | 9/1990 | Heavey et al. | 320/129 |
| 4,965,738 A | 10/1990 | Bauer et al. | 320/136 |
| 4,968,941 A | 11/1990 | Rogers | 324/428 |
| 4,968,942 A | 11/1990 | Palanisamy | 324/430 |
| 4,969,834 A | 11/1990 | Johnson | 439/134 |
| 4,983,086 A | 1/1991 | Hatrock | 411/259 |
| 5,004,979 A | 4/1991 | Marino et al. | 324/160 |
| 5,030,916 A | 7/1991 | Bokitch | 324/503 |
| 5,032,825 A | 7/1991 | Kuznicki | 340/636.15 |
| 5,034,893 A | 7/1991 | Fisher | 701/99 |
| 5,037,335 A | 8/1991 | Campbell | 439/217 |
| 5,037,778 A | 8/1991 | Stark et al. | 228/121 |
| 5,047,722 A | 9/1991 | Wurst et al. | 324/430 |
| 5,081,565 A | 1/1992 | Nabha et al. | 362/465 |
| 5,083,076 A | 1/1992 | Scott | 320/105 |
| 5,087,881 A | 2/1992 | Peacock | 324/378 |
| 5,095,223 A | 3/1992 | Thomas | 307/110 |
| 5,108,320 A | 4/1992 | Kimber | 439/883 |
| 5,109,213 A | 4/1992 | Williams | 340/447 |
| 5,126,675 A | 6/1992 | Yang | 324/435 |
| 5,130,658 A | 7/1992 | Bohmer | 324/435 |
| 5,140,269 A | 8/1992 | Champlin | 324/433 |
| 5,144,218 A | 9/1992 | Bosscha | 320/139 |
| 5,144,248 A | 9/1992 | Alexandres et al. | 324/428 |
| D330,338 S | 10/1992 | Wang | D10/77 |
| 5,159,272 A | 10/1992 | Rao et al. | 324/429 |
| 5,160,881 A | 11/1992 | Schramm et al. | 322/7 |
| 5,164,653 A | 11/1992 | Reem | |
| 5,167,529 A | 12/1992 | Verge | 427/1 |
| 5,168,208 A | 12/1992 | Schultz et al. | 322/25 |
| 5,170,124 A | 12/1992 | Blair et al. | 324/434 |
| 5,179,335 A | 1/1993 | Nor | 320/159 |
| 5,187,382 A | 2/1993 | Kondo | 307/10.1 |
| 5,194,799 A | 3/1993 | Tomantschger | 320/103 |
| 5,202,617 A | 4/1993 | Nor | |
| 5,204,611 A | 4/1993 | Nor et al. | 320/145 |
| 5,214,370 A | 5/1993 | Harm et al. | 320/152 |
| 5,214,385 A | 5/1993 | Gabriel et al. | 324/434 |
| 5,223,747 A | 6/1993 | Tschulena | 257/713 |
| 5,241,275 A | 8/1993 | Fang | 324/430 |
| 5,254,952 A | 10/1993 | Salley et al. | 324/429 |
| 5,266,880 A | 11/1993 | Newland | 320/125 |
| 5,278,759 A | 1/1994 | Berra et al. | 701/1 |
| 5,281,919 A | 1/1994 | Palanisamy | 324/427 |
| 5,281,920 A | 1/1994 | Wurst | 324/430 |
| 5,295,078 A | 3/1994 | Stich et al. | 700/297 |
| 5,296,823 A | 3/1994 | Dietrich | 333/161 |
| 5,298,797 A | 3/1994 | Redl | 327/387 |
| 5,300,874 A | 4/1994 | Shimamoto et al. | 320/106 |
| 5,302,902 A | 4/1994 | Groehl | 324/434 |
| 5,309,052 A | 5/1994 | Kim | 174/350 |
| 5,313,152 A | 5/1994 | Wozniak et al. | 320/118 |
| 5,315,287 A | 5/1994 | Sol | 340/455 |
| 5,321,231 A | 6/1994 | Schmalzriedt et al. | |
| 5,321,626 A | 6/1994 | Palladino | 702/63 |
| 5,321,627 A | 6/1994 | Reher | 702/63 |
| 5,323,337 A | 6/1994 | Wilson et al. | 702/73 |
| 5,325,041 A | 6/1994 | Briggs | 320/149 |
| 5,331,268 A | 7/1994 | Patino et al. | 320/158 |
| 5,332,927 A | 7/1994 | Paul et al. | 307/66 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/147 |
| 5,343,380 A | 8/1994 | Champlin | 363/46 |
| 5,345,384 A | 9/1994 | Przybyla et al. | 701/29.1 |
| 5,347,163 A | 9/1994 | Yoshimura | 307/66 |
| 5,349,535 A | 9/1994 | Gupta | 320/106 |
| 5,352,968 A | 10/1994 | Reni et al. | 320/136 |
| 5,357,519 A | 10/1994 | Martin et al. | 371/15.1 |
| 5,365,160 A | 11/1994 | Leppo et al. | 320/160 |
| 5,365,453 A | 11/1994 | Startup et al. | 702/36 |
| 5,369,364 A | 11/1994 | Renirie et al. | 324/430 |
| 5,381,096 A | 1/1995 | Hirzel | 324/427 |
| 5,384,540 A | 1/1995 | Dessel | 324/539 |
| 5,387,871 A | 2/1995 | Tsai | 324/429 |
| 5,394,093 A | 2/1995 | Cervas | 324/556 |
| 5,402,007 A | 3/1995 | Center et al. | 290/40 B |
| 5,410,754 A | 4/1995 | Klotzbach et al. | 370/466 |
| 5,412,308 A | 5/1995 | Brown | 323/267 |
| 5,412,323 A | 5/1995 | Kato et al. | 324/429 |
| 5,425,041 A | 6/1995 | Seko et al. | 372/45.01 |
| 5,426,371 A | 6/1995 | Salley et al. | 324/429 |
| 5,426,416 A | 6/1995 | Jefferies et al. | 340/664 |
| 5,430,645 A | 7/1995 | Keller | 364/424.01 |
| 5,432,025 A | 7/1995 | Cox | 429/65 |
| 5,432,426 A | 7/1995 | Yoshida | 320/160 |
| 5,432,429 A | 7/1995 | Armstrong, II et al. | |
| 5,434,495 A | 7/1995 | Toko | 320/135 |
| 5,435,185 A | 7/1995 | Eagan | 73/587 |
| 5,442,274 A | 8/1995 | Tamai | 320/146 |
| 5,445,026 A | 8/1995 | Eagan | 73/591 |
| 5,449,996 A | 9/1995 | Matsumoto et al. | 320/148 |
| 5,449,997 A | 9/1995 | Gilmore et al. | 320/148 |
| 5,451,881 A | 9/1995 | Finger | 324/433 |
| 5,453,027 A | 9/1995 | Buell et al. | 439/433 |
| 5,457,377 A | 10/1995 | Jonsson | 324/430 |
| 5,459,660 A | 10/1995 | Berra | 701/33 |
| 5,462,439 A | 10/1995 | Keith | 180/279 |
| 5,469,043 A | 11/1995 | Cherng et al. | 320/161 |
| 5,485,090 A | 1/1996 | Stephens | 324/433 |
| 5,486,123 A | 1/1996 | Miyazaki | 439/825 |
| 5,488,300 A | 1/1996 | Jamieson | 324/432 |
| 5,504,674 A | 4/1996 | Chen et al. | 705/4 |
| 5,508,599 A | 4/1996 | Koenck | 320/138 |
| 5,519,383 A | 5/1996 | De La Rosa | 340/636.15 |
| 5,528,148 A | 6/1996 | Rogers | 320/137 |
| 5,537,967 A | 7/1996 | Tashiro et al. | 123/192.1 |
| 5,541,489 A | 7/1996 | Dunstan | 320/134 |
| 5,546,317 A | 8/1996 | Andrieu | 702/63 |
| 5,548,273 A | 8/1996 | Nicol et al. | 340/439 |
| 5,550,485 A | 8/1996 | Falk | 324/772 |
| 5,555,498 A | 9/1996 | Berra | |
| 5,561,380 A | 10/1996 | Sway-Tin et al. | 324/509 |
| 5,562,501 A | 10/1996 | Kinoshita et al. | 439/852 |
| 5,563,496 A | 10/1996 | McClure | 320/128 |
| 5,572,136 A | 11/1996 | Champlin | 324/426 |
| 5,573,611 A | 11/1996 | Koch et al. | 152/152.1 |
| 5,574,355 A | 11/1996 | McShane et al. | 320/161 |
| 5,578,915 A | 11/1996 | Crouch, Jr. et al. | 324/428 |
| 5,583,416 A | 12/1996 | Klang | 320/160 |
| 5,585,416 A | 12/1996 | Audett et al. | 522/35 |
| 5,585,728 A | 12/1996 | Champlin | 324/427 |
| 5,589,292 A | 12/1996 | Rozon | |
| 5,589,757 A | 12/1996 | Klang | 320/160 |
| 5,592,093 A | 1/1997 | Klingbiel | 324/426 |
| 5,592,094 A | 1/1997 | Ichikawa | 324/427 |
| 5,596,260 A | 1/1997 | Moravec et al. | 320/135 |
| 5,596,261 A | 1/1997 | Suyama | 320/152 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/106 |
| 5,614,788 A | 3/1997 | Mullins et al. | 315/82 |
| 5,621,298 A | 4/1997 | Harvey | 320/134 |
| 5,631,536 A | 5/1997 | Tseng | 320/15 |
| 5,631,831 A | 5/1997 | Bird et al. | 701/34.4 |
| 5,633,985 A | 5/1997 | Severson et al. | 704/267 |
| 5,637,978 A | 6/1997 | Kellett et al. | 320/104 |
| 5,642,031 A | 6/1997 | Brotto | 320/156 |
| 5,644,212 A | 7/1997 | Takahashi | 320/134 |
| 5,650,937 A | 7/1997 | Bounaga | 702/65 |
| 5,652,501 A | 7/1997 | McClure et al. | 340/636.15 |
| 5,653,659 A | 8/1997 | Kunibe et al. | 477/111 |
| 5,654,623 A | 8/1997 | Shiga et al. | 320/106 |
| 5,656,920 A | 8/1997 | Cherng et al. | 324/431 |
| 5,661,368 A | 8/1997 | Deol et al. | 315/82 |
| 5,666,040 A | 9/1997 | Bourbeau | 320/118 |

(56) References Cited

U.S. PATENT DOCUMENTS

| | | | |
|---|---|---|---|
| 5,675,234 A | 10/1997 | Greene | 340/636.11 |
| 5,677,077 A | 10/1997 | Faulk | 429/90 |
| 5,684,678 A | 11/1997 | Barrett | 363/17 |
| 5,685,734 A | 11/1997 | Kutz | 439/371 |
| 5,691,621 A | 11/1997 | Phuoc et al. | 320/134 |
| 5,699,050 A | 12/1997 | Kanazawa | 340/636.13 |
| 5,701,089 A | 12/1997 | Perkins | 324/772 |
| 5,705,929 A | 1/1998 | Caravello et al. | 324/430 |
| 5,707,015 A | 1/1998 | Guthrie | 241/120 |
| 5,710,503 A | 1/1998 | Sideris et al. | 320/116 |
| 5,711,648 A | 1/1998 | Hammerslag | 414/800 |
| 5,712,795 A | 1/1998 | Layman et al. | 700/297 |
| 5,717,336 A | 2/1998 | Basell et al. | 324/430 |
| 5,717,937 A | 2/1998 | Fritz | 713/300 |
| 5,721,688 A | 2/1998 | Bramwell | 324/426 |
| 5,732,074 A | 3/1998 | Spaur et al. | 370/313 |
| 5,739,667 A | 4/1998 | Matsuda et al. | 320/128 |
| 5,744,962 A | 4/1998 | Alber et al. | 324/426 |
| 5,745,044 A | 4/1998 | Hyatt, Jr. et al. | 340/5.23 |
| 5,747,189 A | 5/1998 | Perkins | 429/91 |
| 5,747,909 A | 5/1998 | Syverson et al. | 310/156.56 |
| 5,747,967 A | 5/1998 | Muljadi et al. | 320/148 |
| 5,754,417 A | 5/1998 | Nicollini | 363/60 |
| 5,757,192 A | 5/1998 | McShane et al. | 324/427 |
| 5,760,587 A | 6/1998 | Harvey | 324/434 |
| 5,772,468 A | 6/1998 | Kowalski et al. | 439/506 |
| 5,773,962 A | 6/1998 | Nor | 320/134 |
| 5,773,978 A | 6/1998 | Becker | 324/430 |
| 5,778,326 A | 7/1998 | Moroto et al. | 701/22 |
| 5,780,974 A | 7/1998 | Pabla et al. | 315/82 |
| 5,780,980 A | 7/1998 | Naito | 318/139 |
| 5,789,899 A | 8/1998 | van Phuoc et al. | 320/112 |
| 5,793,359 A | 8/1998 | Ushikubo | 345/169 |
| 5,796,239 A | 8/1998 | van Phuoc et al. | 320/107 |
| 5,808,469 A | 9/1998 | Kopera | 324/434 |
| 5,811,978 A | 9/1998 | Rhein | 324/718 |
| 5,818,201 A | 10/1998 | Stockstad et al. | 320/119 |
| 5,818,234 A | 10/1998 | McKinnon | 324/433 |
| 5,820,407 A | 10/1998 | Morse et al. | 439/504 |
| 5,821,756 A | 10/1998 | McShane et al. | 324/430 |
| 5,821,757 A | 10/1998 | Alvarez et al. | 324/434 |
| 5,825,174 A | 10/1998 | Parker | 324/106 |
| 5,826,467 A | 10/1998 | Huang | |
| 5,831,435 A | 11/1998 | Troy | 324/426 |
| 5,832,396 A | 11/1998 | Moroto et al. | 701/22 |
| 5,850,113 A | 12/1998 | Weimer et al. | 307/125 |
| 5,862,515 A | 1/1999 | Kobayashi et al. | 702/63 |
| 5,865,638 A | 2/1999 | Trafton | 439/288 |
| 5,869,951 A | 2/1999 | Takahashi | 320/104 |
| 5,870,021 A | 2/1999 | Person | 307/10.2 |
| 5,871,858 A | 2/1999 | Thomsen et al. | 429/7 |
| 5,872,443 A | 2/1999 | Williamson | 320/160 |
| 5,872,453 A | 2/1999 | Shimoyama et al. | 324/431 |
| 5,883,306 A | 3/1999 | Hwang | 73/146.8 |
| 5,884,202 A | 3/1999 | Jomand | 701/31.4 |
| 5,894,222 A | 4/1999 | Hibino | |
| 5,895,440 A | 4/1999 | Proctor et al. | 702/63 |
| 5,903,154 A | 5/1999 | Zhang et al. | 324/437 |
| 5,903,716 A | 5/1999 | Kimber et al. | 395/114 |
| 5,912,534 A | 6/1999 | Benedict | 315/82 |
| 5,914,605 A | 6/1999 | Bertness | 324/430 |
| 5,916,287 A | 6/1999 | Arjomand et al. | 701/33.2 |
| 5,927,938 A | 7/1999 | Hammerslag | 414/809 |
| 5,929,609 A | 7/1999 | Joy et al. | 322/25 |
| 5,935,180 A | 8/1999 | Fieramosca et al. | 701/29.6 |
| 5,939,855 A | 8/1999 | Proctor et al. | 320/104 |
| 5,939,861 A | 8/1999 | Joko et al. | 320/122 |
| 5,945,829 A | 8/1999 | Bertness | 324/430 |
| 5,946,605 A | 8/1999 | Takahisa et al. | 455/68 |
| 5,950,144 A | 9/1999 | Hall et al. | 702/108 |
| 5,951,229 A | 9/1999 | Hammerslag | 414/398 |
| 5,953,322 A | 9/1999 | Kimball | 370/328 |
| 5,955,951 A | 9/1999 | Wischerop et al. | 340/572.8 |
| 5,961,561 A | 10/1999 | Wakefield, II | 701/29 |
| 5,961,604 A | 10/1999 | Anderson et al. | 709/229 |
| 5,963,012 A | 10/1999 | Garcia et al. | 320/106 |
| 5,969,625 A | 10/1999 | Russo | 340/636.19 |
| 5,973,598 A | 10/1999 | Beigel | 340/572.1 |
| 5,978,805 A | 11/1999 | Carson | 707/10 |
| 5,982,138 A | 11/1999 | Krieger | 320/105 |
| 5,990,664 A | 11/1999 | Rahman | 320/136 |
| 6,002,238 A | 12/1999 | Champlin | 320/134 |
| 6,005,489 A | 12/1999 | Siegle et al. | 340/825.69 |
| 6,005,759 A | 12/1999 | Hart et al. | 361/66 |
| 6,008,652 A | 12/1999 | Theofanopoulos et al. | 324/434 |
| 6,009,369 A | 12/1999 | Boisvert et al. | 701/99 |
| 6,009,742 A | 1/2000 | Balko | |
| 6,016,047 A | 1/2000 | Notten et al. | 320/137 |
| 6,031,354 A | 2/2000 | Wiley et al. | 320/116 |
| 6,031,368 A | 2/2000 | Klippel et al. | 324/133 |
| 6,037,745 A | 3/2000 | Koike et al. | 320/104 |
| 6,037,751 A | 3/2000 | Klang | 320/160 |
| 6,037,777 A | 3/2000 | Champlin | 324/430 |
| 6,037,778 A | 3/2000 | Makhija | 324/433 |
| 6,037,749 A | 4/2000 | Parsonage | 320/132 |
| 6,046,514 A | 4/2000 | Rouillard et al. | 307/77 |
| 6,051,976 A | 4/2000 | Bertness | 324/426 |
| 6,055,468 A | 4/2000 | Kaman et al. | 701/29 |
| 6,061,638 A | 5/2000 | Joyce | 702/63 |
| 6,064,372 A | 5/2000 | Kahkoska | 345/173 |
| 6,072,299 A | 6/2000 | Kurle et al. | 320/112 |
| 6,072,300 A | 6/2000 | Tsuji | 320/116 |
| 6,075,339 A | 6/2000 | Reipur et al. | 320/110 |
| 6,076,018 A | 6/2000 | Sturman et al. | |
| 6,081,098 A | 6/2000 | Bertness et al. | 320/134 |
| 6,081,109 A | 6/2000 | Seymour et al. | 324/127 |
| 6,081,154 A | 6/2000 | Ezell et al. | 327/540 |
| 6,087,815 A | 7/2000 | Pfeifer et al. | 323/282 |
| 6,091,238 A | 7/2000 | McDermott | 324/207.2 |
| 6,091,245 A | 7/2000 | Bertness | 324/426 |
| 6,094,030 A | 7/2000 | Gimthorpe et al. | |
| 6,094,033 A | 7/2000 | Ding et al. | 320/132 |
| 6,097,193 A | 8/2000 | Bramwell | 324/429 |
| 6,100,670 A | 8/2000 | Levesque | 320/150 |
| 6,100,815 A | 8/2000 | Pailthorp | 324/754.07 |
| 6,104,167 A | 8/2000 | Bertness et al. | 320/132 |
| 6,113,262 A | 9/2000 | Purola et al. | 374/45 |
| 6,114,834 A | 9/2000 | Parise | 320/109 |
| 6,118,252 A | 9/2000 | Richter | |
| 6,121,880 A | 9/2000 | Scott et al. | 340/572.5 |
| 6,130,519 A | 10/2000 | Whiting et al. | |
| 6,136,914 A | 10/2000 | Hergenrother et al. | 524/495 |
| 6,137,261 A | 10/2000 | Kurle et al. | |
| 6,137,269 A | 10/2000 | Champlin | 320/150 |
| 6,140,797 A | 10/2000 | Dunn | 320/105 |
| 6,141,608 A | 10/2000 | Rother | 701/29.6 |
| 6,144,185 A | 11/2000 | Dougherty et al. | 320/132 |
| 6,147,598 A | 11/2000 | Murphy et al. | 340/426.19 |
| 6,149,653 A | 11/2000 | Deslauriers | 606/232 |
| 6,150,793 A | 11/2000 | Lesesky et al. | 320/104 |
| 6,158,000 A | 12/2000 | Collins | 713/1 |
| 6,161,640 A | 12/2000 | Yamaguchi | 180/65.8 |
| 6,163,156 A | 12/2000 | Bertness | 324/426 |
| 6,164,063 A | 12/2000 | Mendler | 60/274 |
| 6,167,349 A | 12/2000 | Alvarez | 702/63 |
| 6,172,483 B1 | 1/2001 | Champlin | 320/134 |
| 6,172,505 B1 | 1/2001 | Bertness | 324/430 |
| 6,177,737 B1 | 1/2001 | Palfey et al. | 307/64 |
| 6,177,878 B1 | 1/2001 | Tamura | |
| 6,181,545 B1 | 1/2001 | Amatucci et al. | 361/502 |
| 6,184,655 B1 | 2/2001 | Malackowski | 320/116 |
| 6,184,656 B1 | 2/2001 | Karunasiri et al. | 320/119 |
| 6,191,557 B1 | 2/2001 | Gray et al. | 320/132 |
| 6,202,739 B1 | 3/2001 | Pal et al. | 165/104.33 |
| 6,211,651 B1 | 4/2001 | Nemoto | 320/133 |
| 6,211,653 B1 | 4/2001 | Stasko | 320/132 |
| 6,215,275 B1 | 4/2001 | Bean | 320/106 |
| 6,218,805 B1 | 4/2001 | Melcher | 320/105 |
| 6,218,936 B1 | 4/2001 | Imao | 340/447 |
| 6,222,342 B1 | 4/2001 | Eggert et al. | 320/105 |
| 6,222,369 B1 | 4/2001 | Champlin | 324/430 |
| D442,503 S | 5/2001 | Lundbeck et al. | D10/77 |
| 6,225,808 B1 | 5/2001 | Varghese et al. | 324/426 |
| 6,225,898 B1 | 5/2001 | Kamiya et al. | 340/505 |

(56) References Cited

U.S. PATENT DOCUMENTS

| | | | |
|---|---|---|---|
| 6,236,186 B1 | 5/2001 | Helton et al. | 320/106 |
| 6,236,332 B1 | 5/2001 | Conkright et al. | 340/3.1 |
| 6,236,949 B1 | 5/2001 | Hart | 702/64 |
| 6,238,253 B1 | 5/2001 | Qualls | 439/759 |
| 6,242,887 B1 | 6/2001 | Burke | 320/104 |
| 6,242,921 B1 | 6/2001 | Thibedeau et al. | 324/429 |
| 6,249,124 B1 | 6/2001 | Bertness | 324/426 |
| 6,250,973 B1 | 6/2001 | Lowery et al. | 439/763 |
| 6,252,942 B1 | 6/2001 | Zoiss | 379/19 |
| 6,254,438 B1 | 7/2001 | Gaunt | 439/755 |
| 6,255,826 B1 | 7/2001 | Ohsawa | 320/116 |
| 6,259,170 B1 | 7/2001 | Limoge et al. | 307/10.8 |
| 6,259,254 B1 | 7/2001 | Klang | 324/427 |
| 6,262,563 B1 | 7/2001 | Champlin | 320/134 |
| 6,262,692 B1 | 7/2001 | Babb | 343/895 |
| 6,263,268 B1 | 7/2001 | Nathanson | 701/29 |
| 6,263,322 B1 | 7/2001 | Kirkevold et al. | 705/400 |
| 6,271,643 B1 | 8/2001 | Becker et al. | 320/112 |
| 6,271,748 B1 | 8/2001 | Derbyshire et al. | 340/442 |
| 6,272,387 B1 | 8/2001 | Yoon | 700/83 |
| 6,275,008 B1 | 8/2001 | Arai et al. | 320/132 |
| 6,285,191 B1 | 9/2001 | Gollomp et al. | 324/427 |
| 6,294,896 B1 | 9/2001 | Champlin | 320/134 |
| 6,294,897 B1 | 9/2001 | Champlin | 320/153 |
| 6,304,087 B1 | 10/2001 | Bertness | 324/426 |
| 6,307,349 B1 | 10/2001 | Koenck et al. | 320/112 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 320/132 |
| 6,316,914 B1 | 11/2001 | Bertness | 320/134 |
| 6,320,385 B1 | 11/2001 | Ng et al. | 320/104 |
| 6,323,650 B1 | 11/2001 | Bertness et al. | 324/426 |
| 6,324,042 B1 | 11/2001 | Andrews | 361/93.2 |
| 6,329,793 B1 | 12/2001 | Bertness et al. | 320/132 |
| 6,331,762 B1 | 12/2001 | Bertness | 320/134 |
| 6,332,113 B1 | 12/2001 | Bertness | 702/63 |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,356,042 B1 | 3/2002 | Kahlon et al. | 318/138 |
| 6,356,083 B1 | 3/2002 | Ying | 324/426 |
| 6,359,441 B1 | 3/2002 | Bertness | 324/426 |
| 6,359,442 B1 | 3/2002 | Henningson et al. | 324/426 |
| 6,363,303 B1 | 3/2002 | Bertness | 701/29 |
| RE37,677 E | 4/2002 | Irie | 315/83 |
| 6,377,031 B1 | 4/2002 | Karuppana et al. | 323/220 |
| 6,384,608 B1 | 5/2002 | Namaky | 324/430 |
| 6,388,448 B1 | 5/2002 | Cervas | 324/426 |
| 6,389,337 B1 | 5/2002 | Kolls | 701/31.6 |
| 6,392,414 B2 | 5/2002 | Bertness | 324/429 |
| 6,396,278 B1 | 5/2002 | Makhija | 324/402 |
| 6,407,554 B1 | 6/2002 | Godau et al. | 324/503 |
| 6,411,098 B1 | 6/2002 | Laletin | 324/436 |
| 6,417,669 B1 | 7/2002 | Champlin | 324/426 |
| 6,420,852 B1 | 7/2002 | Sato | 320/134 |
| 6,424,157 B1 | 7/2002 | Gollomp et al. | 324/430 |
| 6,424,158 B2 | 7/2002 | Klang | 324/433 |
| 6,426,606 B1 | 7/2002 | Purkey | |
| 6,433,512 B1 | 8/2002 | Birkler et al. | 320/132 |
| 6,437,957 B1 | 8/2002 | Karuppana et al. | 361/78 |
| 6,441,585 B1 | 8/2002 | Bertness | 320/132 |
| 6,445,158 B1 | 9/2002 | Bertness et al. | 320/104 |
| 6,448,778 B1 | 9/2002 | Rankin | 324/503 |
| 6,449,726 B1 | 9/2002 | Smith | 713/340 |
| 6,456,036 B1 | 9/2002 | Thandiwe | 320/106 |
| 6,456,045 B1 | 9/2002 | Troy et al. | 320/139 |
| 6,465,908 B1 | 10/2002 | Karuppana et al. | 307/31 |
| 6,466,025 B1 | 10/2002 | Klang | 324/429 |
| 6,466,026 B1 | 10/2002 | Champlin | 324/430 |
| 6,469,511 B1 | 10/2002 | Vonderhaar et al. | 324/425 |
| 6,473,659 B1 | 10/2002 | Shah et al. | 700/79 |
| 6,477,478 B1 | 11/2002 | Jones et al. | 702/102 |
| 6,495,990 B2 | 12/2002 | Champlin | 320/132 |
| 6,497,209 B1 | 12/2002 | Karuppana et al. | 123/179.3 |
| 6,500,025 B1 | 12/2002 | Moenkhaus et al. | 439/502 |
| 6,501,243 B1 | 12/2002 | Kaneko | 318/139 |
| 6,505,507 B1 | 1/2003 | Imao | 73/146.5 |
| 6,507,196 B2 | 1/2003 | Thomsen et al. | 324/436 |
| 6,526,361 B1 | 2/2003 | Jones et al. | 702/63 |
| 6,529,723 B1 | 3/2003 | Bentley | 455/405 |
| 6,531,847 B1 | 3/2003 | Tsukamoto et al. | |
| 6,531,848 B1 | 3/2003 | Chitsazan et al. | 320/153 |
| 6,532,425 B1 | 3/2003 | Boost et al. | 702/63 |
| 6,533,316 B2 | 3/2003 | Breed et al. | 280/735 |
| 6,534,992 B2 | 3/2003 | Meissner et al. | 324/426 |
| 6,534,993 B2 | 3/2003 | Bertness | 324/433 |
| 6,536,536 B1 | 3/2003 | Gass et al. | 173/2 |
| 6,544,078 B2 | 4/2003 | Palmisano et al. | 439/762 |
| 6,545,599 B2 | 4/2003 | Derbyshire et al. | 340/442 |
| 6,556,019 B2 | 4/2003 | Bertness | 324/426 |
| 6,566,883 B1 | 5/2003 | Vonderhaar et al. | 324/426 |
| 6,570,385 B1 | 5/2003 | Roberts et al. | 324/378 |
| 6,573,685 B2 | 6/2003 | Nakanishi et al. | |
| 6,577,107 B2 | 6/2003 | Kechmire | 320/139 |
| 6,586,941 B2 | 7/2003 | Bertness et al. | 324/426 |
| 6,597,150 B1 | 7/2003 | Bertness et al. | 320/104 |
| 6,599,243 B2 | 7/2003 | Woltermann et al. | 600/300 |
| 6,600,815 B1 | 7/2003 | Walding | 379/93.07 |
| 6,611,740 B2 | 8/2003 | Lowrey et al. | 701/29 |
| 6,614,349 B1 | 9/2003 | Proctor et al. | 340/572.1 |
| 6,618,644 B2 | 9/2003 | Bean | 700/231 |
| 6,621,272 B2 | 9/2003 | Champlin | 324/426 |
| 6,623,314 B1 | 9/2003 | Cox et al. | 439/759 |
| 6,624,635 B1 | 9/2003 | Lui | 324/426 |
| 6,628,011 B2 | 9/2003 | Droppo et al. | 307/43 |
| 6,629,054 B2 | 9/2003 | Makhija et al. | 702/113 |
| 6,633,165 B2 | 10/2003 | Bertness | 324/426 |
| 6,635,974 B1 | 10/2003 | Karuppana et al. | 307/140 |
| 6,636,790 B1 | 10/2003 | Lightner et al. | 701/31.5 |
| 6,667,624 B1 | 12/2003 | Raichle et al. | 324/522 |
| 6,679,212 B2 | 1/2004 | Kelling | 123/179.28 |
| 6,686,542 B2 | 2/2004 | Zhang | 174/74 |
| 6,696,819 B2 | 2/2004 | Bertness | 320/134 |
| 6,707,303 B2 | 3/2004 | Bertness et al. | 324/426 |
| 6,732,031 B1 | 5/2004 | Lightner et al. | 701/31.4 |
| 6,736,941 B2 | 5/2004 | Oku et al. | 203/68 |
| 6,737,831 B2 | 5/2004 | Champlin | 320/132 |
| 6,738,697 B2 | 5/2004 | Breed | 701/29 |
| 6,740,990 B2 | 5/2004 | Tozuka et al. | 307/9.1 |
| 6,744,149 B1 | 6/2004 | Karuppana et al. | 307/31 |
| 6,745,153 B2 | 6/2004 | White et al. | 702/184 |
| 6,759,849 B2 | 7/2004 | Bertness | 324/426 |
| 6,771,073 B2 | 8/2004 | Henningson et al. | 324/426 |
| 6,777,945 B2 | 8/2004 | Roberts et al. | 324/426 |
| 6,781,344 B1 | 8/2004 | Hedegor et al. | 320/106 |
| 6,781,382 B2 | 8/2004 | Johnson | 324/426 |
| 6,784,635 B2 | 8/2004 | Larson | 320/104 |
| 6,784,637 B2 | 8/2004 | Raichle et al. | 320/107 |
| 6,788,025 B2 | 9/2004 | Bertness et al. | 320/104 |
| 6,795,782 B2 | 9/2004 | Bertness et al. | 702/63 |
| 6,796,841 B1 | 9/2004 | Cheng et al. | 439/620.3 |
| 6,805,090 B2 | 10/2004 | Bertness et al. | 123/198 |
| 6,806,716 B2 | 10/2004 | Bertness et al. | 324/426 |
| 6,825,669 B2 | 11/2004 | Raichle et al. | 324/426 |
| 6,832,141 B2 | 12/2004 | Skeen et al. | 701/31.4 |
| 6,842,707 B2 | 1/2005 | Raichle et al. | 702/62 |
| 6,845,279 B1 | 1/2005 | Gilmore et al. | 700/115 |
| 6,850,037 B2 | 2/2005 | Bertness | 320/132 |
| 6,856,162 B1 | 2/2005 | Greatorex et al. | 324/764.01 |
| 6,856,972 B1 | 2/2005 | Yun et al. | 705/36 R |
| 6,871,151 B2 | 3/2005 | Bertness | 702/63 |
| 6,885,195 B2 | 4/2005 | Bertness | 324/426 |
| 6,888,468 B2 | 5/2005 | Bertness | 340/636.15 |
| 6,891,378 B2 | 5/2005 | Bertness et al. | 324/426 |
| 6,895,809 B2 | 5/2005 | Raichle | 73/119 |
| 6,904,796 B2 | 6/2005 | Pacsai et al. | 73/146.8 |
| 6,906,522 B2 | 6/2005 | Bertness et al. | 324/426 |
| 6,906,523 B2 | 6/2005 | Bertness et al. | 324/426 |
| 6,906,624 B2 | 6/2005 | McClelland et al. | 340/442 |
| 6,909,287 B2 | 6/2005 | Bertness | 324/427 |
| 6,909,356 B2 | 6/2005 | Brown et al. | 340/3.2 |
| 6,911,825 B2 | 6/2005 | Namaky | 324/426 |
| 6,913,483 B2 | 7/2005 | Restaino et al. | 439/504 |
| 6,914,413 B2 | 7/2005 | Bertness et al. | 320/104 |

(56) References Cited

U.S. PATENT DOCUMENTS

| | | | |
|---|---|---|---|
| 6,919,725 B2 | 7/2005 | Bertness et al. | 324/433 |
| 6,930,485 B2 | 8/2005 | Bertness et al. | 324/426 |
| 6,933,727 B2 | 8/2005 | Bertness et al. | 324/426 |
| 6,941,234 B2 | 9/2005 | Bertness et al. | 702/63 |
| 6,957,133 B1 | 10/2005 | Hunt et al. | 701/32.4 |
| 6,961,445 B1 | 11/2005 | Jensen et al. | |
| 6,967,484 B2 | 11/2005 | Bertness | 324/426 |
| 6,972,662 B1 | 12/2005 | Ohkawa et al. | 340/10.1 |
| 6,983,212 B2 | 1/2006 | Burns | 702/63 |
| 6,988,053 B2 | 1/2006 | Namaky | 320/104 |
| 6,993,421 B2 | 1/2006 | Pillar et al. | 701/29.4 |
| 6,998,847 B2 | 2/2006 | Bertness et al. | 324/426 |
| 7,003,410 B2 | 2/2006 | Bertness et al. | 702/63 |
| 7,003,411 B2 | 2/2006 | Bertness | 702/63 |
| 7,012,433 B2 | 3/2006 | Smith et al. | 324/426 |
| 7,015,674 B2 | 3/2006 | VonderHaar | 320/103 |
| 7,029,338 B1 | 4/2006 | Orange et al. | 439/755 |
| 7,034,541 B2 | 4/2006 | Bertness et al. | 324/426 |
| 7,039,533 B2 | 5/2006 | Bertness et al. | 702/63 |
| 7,042,346 B2 | 5/2006 | Paulsen | 340/438 |
| 7,049,822 B2 | 5/2006 | Kung | 324/426 |
| 7,058,525 B2 | 6/2006 | Bertness et al. | 702/63 |
| 7,069,979 B2 | 7/2006 | Tobias | 165/104.33 |
| 7,081,755 B2 | 7/2006 | Klang et al. | 324/426 |
| 7,089,127 B2 | 8/2006 | Thibedeau et al. | 702/63 |
| 7,098,666 B2 | 8/2006 | Patino | 324/433 |
| 7,102,556 B2 | 9/2006 | White | 341/141 |
| 7,106,070 B2 | 9/2006 | Bertness et al. | 324/538 |
| 7,116,109 B2 | 10/2006 | Klang | 324/426 |
| 7,119,686 B2 | 10/2006 | Bertness et al. | 340/572.1 |
| 7,120,488 B2 | 10/2006 | Nova et al. | 600/2 |
| 7,126,341 B2 | 10/2006 | Bertness et al. | 324/426 |
| 7,129,706 B2 | 10/2006 | Kalley | 324/426 |
| 7,154,276 B2 | 12/2006 | Bertness | 324/503 |
| 7,170,393 B2 | 1/2007 | Martin | 340/10.1 |
| 7,173,182 B2 | 2/2007 | Katsuyama | 174/36 |
| 7,177,925 B2 | 2/2007 | Carcido et al. | 709/223 |
| 7,182,147 B2 | 2/2007 | Cutler et al. | 173/1 |
| 7,184,866 B2 | 2/2007 | Squires | 340/426.15 |
| 7,184,905 B2 | 2/2007 | Stefan | 702/63 |
| 7,198,510 B2 | 4/2007 | Bertness | 439/500 |
| 7,200,424 B2 | 4/2007 | Tischer et al. | 455/567 |
| 7,202,636 B2 | 4/2007 | Reynolds et al. | 320/166 |
| 7,208,914 B2 | 4/2007 | Klang | 320/132 |
| 7,209,850 B2 | 4/2007 | Brott et al. | 324/426 |
| 7,209,860 B2 | 4/2007 | Trsar et al. | 702/183 |
| 7,212,887 B2 | 5/2007 | Shah et al. | 700/276 |
| 7,212,911 B2 | 5/2007 | Raichle et al. | 701/114 |
| 7,219,023 B2 | 5/2007 | Banke et al. | 702/58 |
| 7,233,128 B2 | 6/2007 | Brost et al. | 320/132 |
| 7,235,977 B2 | 6/2007 | Koran et al. | 324/426 |
| 7,246,015 B2 | 7/2007 | Bertness et al. | 702/63 |
| 7,251,551 B2 | 7/2007 | Mitsueda | 700/2 |
| 7,272,519 B2 | 9/2007 | Lesesky et al. | 702/63 |
| 7,287,001 B1 | 10/2007 | Falls et al. | 705/22 |
| 7,295,936 B2 | 11/2007 | Bertness et al. | 702/63 |
| 7,301,303 B1 | 11/2007 | Hulden | 320/103 |
| 7,319,304 B2 | 1/2008 | Veloo et al. | 320/134 |
| 7,339,477 B2 | 3/2008 | Puzio et al. | 340/572.1 |
| 7,363,175 B2 | 4/2008 | Bertness et al. | 702/63 |
| 7,376,497 B2 | 5/2008 | Chen | 701/31.6 |
| 7,398,176 B2 | 7/2008 | Bertness | 702/140 |
| 7,408,358 B2 | 8/2008 | Knopf | 324/426 |
| 7,425,833 B2 | 9/2008 | Bertness et al. | 324/426 |
| 7,446,536 B2 | 11/2008 | Bertness | 324/426 |
| 7,453,238 B2 | 11/2008 | Melichar | 320/132 |
| 7,479,763 B2 | 1/2009 | Bertness | 320/134 |
| 7,498,767 B2 | 3/2009 | Brown et al. | 320/107 |
| 7,501,795 B2 | 3/2009 | Bertness et al. | 320/134 |
| 7,504,830 B2 | 3/2009 | Keuss | |
| 7,505,856 B2 | 3/2009 | Restaino et al. | 702/63 |
| 7,538,571 B2 | 5/2009 | Raichle et al. | 324/772 |
| 7,545,146 B2 | 6/2009 | Klang et al. | 324/426 |
| 7,557,586 B1 | 7/2009 | Vonderhaar et al. | 324/437 |
| 7,571,035 B2 | 8/2009 | Raichle | |
| 7,590,476 B2 | 9/2009 | Shumate | 701/31.6 |
| 7,592,776 B2 | 9/2009 | Tsukamoto et al. | 320/136 |
| 7,595,643 B2 | 9/2009 | Klang | 324/426 |
| 7,596,437 B1 | 9/2009 | Hunt et al. | |
| 7,598,699 B2 | 10/2009 | Restaino et al. | 320/105 |
| 7,598,743 B2 | 10/2009 | Bertness | 324/426 |
| 7,598,744 B2 | 10/2009 | Bertness et al. | 324/426 |
| 7,619,417 B2 | 11/2009 | Klang | 324/427 |
| 7,642,786 B2 | 1/2010 | Philbrook | 324/426 |
| 7,642,787 B2 | 1/2010 | Bertness et al. | 324/426 |
| 7,656,162 B2 | 2/2010 | Vonderhaar et al. | 324/426 |
| 7,657,386 B2 | 2/2010 | Thibedeau et al. | 702/63 |
| 7,667,437 B2 | 2/2010 | Johnson et al. | 320/150 |
| 7,679,325 B2 | 3/2010 | Seo | 320/116 |
| 7,684,908 B1 | 3/2010 | Ogilvie et al. | 701/29.6 |
| 7,688,074 B2 | 3/2010 | Cox et al. | 324/426 |
| 7,690,573 B2 | 4/2010 | Raichle et al. | 235/462 |
| 7,696,759 B2 | 4/2010 | Raichle et al. | 324/538 |
| 7,698,179 B2 | 4/2010 | Leung et al. | 705/28 |
| 7,705,602 B2 | 4/2010 | Bertness | 324/426 |
| 7,706,991 B2 | 4/2010 | Bertness et al. | 702/63 |
| 7,706,992 B2 | 4/2010 | Ricci et al. | |
| 7,710,119 B2 | 5/2010 | Bertness | 324/426 |
| 7,723,993 B2 | 5/2010 | Klang | 324/431 |
| 7,728,556 B2 | 6/2010 | Yano et al. | 320/134 |
| 7,728,597 B2 | 6/2010 | Bertness | 324/426 |
| 7,729,880 B1 | 6/2010 | Mashburn | 702/151 |
| 7,743,788 B2 | 6/2010 | Schmitt | 137/554 |
| 7,751,953 B2 | 7/2010 | Namaky | 701/33.2 |
| 7,772,850 B2 | 8/2010 | Bertness | 324/426 |
| 7,774,130 B2 | 8/2010 | Pepper | 340/439 |
| 7,774,151 B2 | 8/2010 | Bertness | 702/63 |
| 7,777,612 B2 | 8/2010 | Sampson et al. | 340/426.1 |
| 7,791,348 B2 | 9/2010 | Brown et al. | 324/426 |
| 7,797,995 B2 | 9/2010 | Schaefer | |
| 7,808,375 B2 | 10/2010 | Bertness et al. | 340/455 |
| 7,848,857 B2 | 12/2010 | Nasr et al. | 701/22 |
| 7,883,002 B2 | 2/2011 | Jin et al. | 235/376 |
| 7,902,990 B2 | 3/2011 | Delmonico et al. | 340/636.1 |
| 7,914,350 B1 | 3/2011 | Bozich | 439/506 |
| 7,924,015 B2 | 4/2011 | Bertness | 324/427 |
| 7,940,052 B2 | 5/2011 | Vonderhaar | |
| 7,940,053 B2 | 5/2011 | Brown et al. | 324/426 |
| 7,959,476 B2 | 6/2011 | Smith et al. | |
| 7,977,914 B2 | 7/2011 | Bertness | |
| D643,759 S | 8/2011 | Bertness | |
| 7,990,155 B2 * | 8/2011 | Henningson | G01R 31/374 324/426 |
| 7,999,505 B2 | 8/2011 | Bertness | 320/104 |
| 8,024,083 B2 | 9/2011 | Chenn | 701/2 |
| 8,047,868 B1 | 11/2011 | Korcynski | 439/522 |
| 8,164,343 B2 | 4/2012 | Bertness | 324/503 |
| 8,198,900 B2 | 6/2012 | Bertness et al. | |
| 8,203,345 B2 | 6/2012 | Bertness | |
| 8,222,868 B2 | 7/2012 | Buckner | 320/136 |
| 8,226,008 B2 | 7/2012 | Raichle et al. | 235/462.13 |
| 8,237,448 B2 | 8/2012 | Bertness | |
| 8,306,690 B2 | 11/2012 | Bertness | 701/34.4 |
| 8,310,271 B2 | 11/2012 | Raichle et al. | 324/765.01 |
| 8,344,685 B2 | 1/2013 | Bertness et al. | |
| 8,436,619 B2 | 5/2013 | Bertness et al. | |
| 8,442,877 B2 | 5/2013 | Bertness et al. | |
| 8,449,560 B2 | 5/2013 | Roth | 227/175.1 |
| 8,493,022 B2 | 7/2013 | Bertness | |
| D687,727 S | 8/2013 | Kehoe et al. | |
| 8,509,212 B2 | 8/2013 | Sanjeev | |
| 8,513,949 B2 | 8/2013 | Bertness | |
| 8,594,957 B2 | 11/2013 | Gauthier | 324/548 |
| 8,674,654 B2 | 3/2014 | Bertness | |
| 8,674,711 B2 | 3/2014 | Bertness | |
| 8,704,483 B2 | 4/2014 | Bertness et al. | |
| 8,738,309 B2 | 5/2014 | Bertness | |
| 8,754,653 B2 | 6/2014 | Volderhaar et al. | |
| 8,810,200 B2 | 8/2014 | Kondo | |
| 8,825,272 B1 | 9/2014 | Chinnadurai | |
| 8,827,729 B2 | 9/2014 | Gunreben | 439/188 |
| 8,872,516 B2 | 10/2014 | Bertness | |
| 8,872,517 B2 | 10/2014 | Philbrook et al. | |
| 8,901,888 B1 | 12/2014 | Beckman | |

(56) References Cited

U.S. PATENT DOCUMENTS

| | | |
|---|---|---|
| 8,958,998 B2 | 2/2015 | Bertness |
| 8,963,550 B2 | 2/2015 | Bertness et al. |
| 9,018,958 B2 | 4/2015 | Bertness |
| 9,037,394 B2 | 5/2015 | Fernandes .................. 701/400 |
| 9,052,366 B2 | 6/2015 | Bertness |
| 9,056,556 B1 | 6/2015 | Hyde et al. |
| 9,166,261 B2 | 10/2015 | Ibi |
| 9,201,120 B2 | 12/2015 | Stukenburg |
| 9,229,062 B2 | 1/2016 | Stukenberg |
| 9,244,100 B2 | 1/2016 | Coleman et al. |
| 9,255,955 B2 | 2/2016 | Bertness .................. 324/503 |
| 9,274,157 B2 | 3/2016 | Bertness |
| 9,312,575 B2 | 4/2016 | Stukenberg |
| 9,335,362 B2 | 5/2016 | Bertness |
| 9,419,311 B2 | 8/2016 | Bertness |
| 9,425,487 B2 | 8/2016 | Bertness |
| 9,496,720 B2 | 11/2016 | McShane |
| 9,588,185 B2 | 3/2017 | Champlin |
| 9,639,899 B1 | 5/2017 | Gersitz |
| 9,923,289 B2 | 3/2018 | Bertness |
| 9,966,676 B2 | 5/2018 | Salo, III et al. |
| 10,046,649 B2 | 8/2018 | Bertness |
| 10,222,397 B2 | 3/2019 | Salo et al. |
| 10,317,468 B2 | 6/2019 | Bertness |
| 10,429,449 B2 | 10/2019 | Arnoldus |
| 10,473,555 B2 | 11/2019 | Bertness |
| 10,525,841 B2 | 1/2020 | Zhou et al. |
| 10,608,353 B2 | 3/2020 | Lipkin et al. |
| 10,843,574 B2 | 11/2020 | Palmisano et al. |
| 10,903,532 B2 * | 1/2021 | Mi ..................... H01M 10/425 |
| 11,054,480 B2 | 7/2021 | Bertness |
| 11,325,479 B2 | 5/2022 | Bertness |
| 11,474,153 B2 | 10/2022 | Salo, III et al. |
| 11,486,930 B2 | 11/2022 | Salo, III et al. |
| 11,513,160 B2 | 11/2022 | Salo, III et al. |
| 11,545,839 B2 | 1/2023 | Sampson et al. |
| 11,548,404 B2 | 1/2023 | Bertness |
| 11,566,972 B2 | 1/2023 | Sampson et al. |
| 11,650,259 B2 | 5/2023 | Bertness |
| 11,668,779 B2 | 6/2023 | Bertness |
| 11,740,294 B2 | 8/2023 | Bertness |
| 11,926,224 B2 | 3/2024 | Bertness |
| 11,973,202 B2 * | 4/2024 | Bertness .................. B60L 53/60 |
| 2001/0012738 A1 | 8/2001 | Duperret .................. 439/835 |
| 2001/0033169 A1 | 10/2001 | Singh .................. 324/426 |
| 2001/0035737 A1 | 11/2001 | Nakanishi et al. .......... 320/122 |
| 2001/0048215 A1 | 12/2001 | Breed et al. ............. 280/728.1 |
| 2001/0048226 A1 | 12/2001 | Nada .................. 290/40 |
| 2002/0003423 A1 | 1/2002 | Bertness et al. ........... 324/426 |
| 2002/0004694 A1 | 1/2002 | McLeod .................. 701/29 |
| 2002/0007237 A1 | 1/2002 | Phung et al. .............. 701/33 |
| 2002/0010558 A1 | 1/2002 | Bertness et al. .......... 702/63 |
| 2002/0018927 A1 | 2/2002 | Thomsen et al. |
| 2002/0021135 A1 | 2/2002 | Li et al. .................. 324/677 |
| 2002/0027346 A1 | 3/2002 | Breed et al. .............. 280/735 |
| 2002/0030495 A1 | 3/2002 | Kechmire ................ 324/427 |
| 2002/0036504 A1 | 3/2002 | Troy et al. .............. 324/430 |
| 2002/0041175 A1 | 4/2002 | Lauper et al. ........... 320/106 |
| 2002/0044050 A1 | 4/2002 | Derbyshire et al. ......... 340/457 |
| 2002/0047711 A1 | 4/2002 | Bertness et al. ........... 324/426 |
| 2002/0050163 A1 | 5/2002 | Makhija et al. .......... 73/116 |
| 2002/0065619 A1 | 5/2002 | Bertness ................. 702/63 |
| 2002/0074398 A1 | 6/2002 | Lancos et al. ............ 235/382 |
| 2002/0116140 A1 | 8/2002 | Rider .................. 702/62 |
| 2002/0118111 A1 | 8/2002 | Brown et al. ........... 340/573.1 |
| 2002/0121877 A1 | 9/2002 | Smith et al. |
| 2002/0121901 A1 | 9/2002 | Hoffman ................ 324/426 |
| 2002/0128985 A1 | 9/2002 | Greenwald ............. 705/400 |
| 2002/0130665 A1 | 9/2002 | Bertness et al. ........... 324/426 |
| 2002/0152791 A1 | 10/2002 | Cardinale |
| 2002/0153864 A1 | 10/2002 | Bertness ................. 320/132 |
| 2002/0171428 A1 | 11/2002 | Bertness ................. 702/63 |
| 2002/0176010 A1 | 11/2002 | Wallach et al. ........... 348/362 |
| 2002/0193955 A1 | 12/2002 | Bertness ................. 702/63 |
| 2003/0006779 A1 | 1/2003 | Youval .................. 324/503 |
| 2003/0009270 A1 | 1/2003 | Breed .................. 701/29 |
| 2003/0017753 A1 | 1/2003 | Palmisano et al. ......... 439/762 |
| 2003/0025481 A1 | 2/2003 | Bertness ............... 324/427 |
| 2003/0030442 A1 | 2/2003 | Sugimoto ............... 324/429 |
| 2003/0036909 A1 | 2/2003 | Kato .................. 704/275 |
| 2003/0038637 A1 | 2/2003 | Bertness et al. |
| 2003/0040873 A1 | 2/2003 | Lesesky et al. ........... 702/57 |
| 2003/0060953 A1 | 3/2003 | Chen .................. 701/33 |
| 2003/0078743 A1 | 4/2003 | Bertness et al. .......... 702/63 |
| 2003/0088375 A1 | 5/2003 | Bertness et al. .......... 702/63 |
| 2003/0090272 A1 | 5/2003 | Bertness ............... 324/426 |
| 2003/0114206 A1 | 6/2003 | Timothy ............... 455/575.7 |
| 2003/0124417 A1 | 7/2003 | Bertness et al. .......... 429/90 |
| 2003/0128011 A1 | 7/2003 | Bertness et al. |
| 2003/0128036 A1 | 7/2003 | Henningson et al. ....... 324/426 |
| 2003/0137277 A1 | 7/2003 | Mori et al. ............ 320/132 |
| 2003/0155930 A1 | 8/2003 | Thomsen |
| 2003/0164073 A1 | 9/2003 | Chen |
| 2003/0169018 A1 | 9/2003 | Berels et al. ........... 320/132 |
| 2003/0169019 A1 | 9/2003 | Oosaki ................. 320/132 |
| 2003/0171111 A1 | 9/2003 | Clark .................. 455/414.1 |
| 2003/0173971 A1 | 9/2003 | Bertness ............... 324/441 |
| 2003/0177417 A1 | 9/2003 | Malhotra et al. ......... 714/42 |
| 2003/0184262 A1 | 10/2003 | Makhija ............... 320/156 |
| 2003/0184264 A1 | 10/2003 | Bertness |
| 2003/0184306 A1 | 10/2003 | Bertness et al. .......... 324/426 |
| 2003/0187556 A1 | 10/2003 | Suzuki ................. 701/29 |
| 2003/0194672 A1 | 10/2003 | Roberts et al. .......... 431/196 |
| 2003/0197512 A1 | 10/2003 | Miller et al. ........... 324/426 |
| 2003/0212311 A1 | 11/2003 | Nova et al. ............ 600/300 |
| 2003/0214395 A1 | 11/2003 | Flowerday et al. ........ 340/445 |
| 2003/0224241 A1 | 12/2003 | Takada et al. ........... 429/52 |
| 2003/0236656 A1 | 12/2003 | Dougherty ............. 703/14 |
| 2004/0000590 A1 | 1/2004 | Raichle et al. .......... 235/462.01 |
| 2004/0000891 A1 | 1/2004 | Raichle et al. .......... 320/107 |
| 2004/0000893 A1 | 1/2004 | Raichle et al. .......... 320/135 |
| 2004/0000913 A1 | 1/2004 | Raichle et al. .......... 324/426 |
| 2004/0000915 A1 | 1/2004 | Raichle et al. .......... 324/522 |
| 2004/0002824 A1 | 1/2004 | Raichle et al. .......... 702/63 |
| 2004/0002825 A1 | 1/2004 | Raichle et al. .......... 702/63 |
| 2004/0002836 A1 | 1/2004 | Raichle et al. .......... 702/188 |
| 2004/0032264 A1 | 2/2004 | Schoch ................ 324/426 |
| 2004/0036443 A1 | 2/2004 | Bertness ............... 320/109 |
| 2004/0044452 A1 | 3/2004 | Bauer et al. ........... 703/33 |
| 2004/0044454 A1 | 3/2004 | Ross et al. ............. 701/33 |
| 2004/0046564 A1 | 3/2004 | Klang ................. 324/426 |
| 2004/0049361 A1 | 3/2004 | Hamdan et al. ......... 702/115 |
| 2004/0051532 A1 | 3/2004 | Smith et al. ........... 324/426 |
| 2004/0051533 A1 | 3/2004 | Namaky ............... 324/426 |
| 2004/0051534 A1 | 3/2004 | Kobayashi et al. ........ 324/429 |
| 2004/0054503 A1 | 3/2004 | Namaky ............... 702/182 |
| 2004/0064225 A1 | 4/2004 | Jammu et al. .......... 701/29 |
| 2004/0065489 A1 | 4/2004 | Aberle ................ 180/65.1 |
| 2004/0088087 A1 | 5/2004 | Fukushima et al. ....... 701/32 |
| 2004/0090208 A1 | 5/2004 | Almerich |
| 2004/0104728 A1 | 6/2004 | Bertness et al. .......... 324/429 |
| 2004/0108855 A1 | 6/2004 | Raichle ................ 324/378 |
| 2004/0108856 A1 | 6/2004 | Johnson ............... 324/426 |
| 2004/0113494 A1 | 6/2004 | Karuppana et al. |
| 2004/0113588 A1 | 6/2004 | Mikuriya et al. ........ 320/128 |
| 2004/0145342 A1 | 7/2004 | Lyon .................. 320/108 |
| 2004/0145371 A1 | 7/2004 | Bertness ............... 324/426 |
| 2004/0150494 A1 | 8/2004 | Yoshida ............... 333/243 |
| 2004/0157113 A1 | 8/2004 | Klang ................. 429/50 |
| 2004/0164706 A1 | 8/2004 | Osborne ............... 320/116 |
| 2004/0172177 A1 | 9/2004 | Nagai et al. ........... 701/29 |
| 2004/0178185 A1 | 9/2004 | Yoshikawa et al. ....... 219/270 |
| 2004/0189309 A1 | 9/2004 | Bertness et al. .......... 324/426 |
| 2004/0199343 A1 | 10/2004 | Cardinal et al. ........ 702/63 |
| 2004/0207367 A1 | 10/2004 | Taniguchi et al. ........ 320/149 |
| 2004/0212350 A1 | 10/2004 | Patino et al. |
| 2004/0221641 A1 | 11/2004 | Moritsugu ............. 73/23.31 |
| 2004/0227523 A1 | 11/2004 | Namaky ............... 324/537 |
| 2004/0239332 A1 | 12/2004 | Mackel et al. .......... 324/426 |
| 2004/0251876 A1 | 12/2004 | Bertness et al. .......... 320/136 |
| 2004/0251907 A1 | 12/2004 | Kalley |
| 2004/0257084 A1 | 12/2004 | Restaino .............. 324/400 |
| 2005/0007068 A1 | 1/2005 | Johnson et al. .......... 320/110 |
| 2005/0009122 A1 | 1/2005 | Whelan et al. .......... 435/7.32 |

(56) References Cited

U.S. PATENT DOCUMENTS

| | | | |
|---|---|---|---|
| 2005/0017726 A1 | 1/2005 | Koran et al. ................ 324/433 |
| 2005/0017952 A1 | 1/2005 | His ............................ 345/169 |
| 2005/0021197 A1 | 1/2005 | Zimmerman .............. 701/31.4 |
| 2005/0021294 A1 | 1/2005 | Trsar et al. ................. 702/183 |
| 2005/0021475 A1 | 1/2005 | Bertness ..................... 705/63 |
| 2005/0025299 A1 | 2/2005 | Tischer et al. .............. 379/199 |
| 2005/0035752 A1 | 2/2005 | Bertness |
| 2005/0043868 A1 | 2/2005 | Mitcham ..................... 701/29 |
| 2005/0057256 A1 | 3/2005 | Bertness ..................... 324/426 |
| 2005/0060070 A1 | 3/2005 | Kapolka et al. ............. 701/29 |
| 2005/0073314 A1 | 4/2005 | Bertness et al. ............ 324/433 |
| 2005/0076381 A1 | 4/2005 | Gross ......................... 725/107 |
| 2005/0077904 A1 | 4/2005 | Bertness ..................... 324/426 |
| 2005/0096809 A1 | 5/2005 | Skeen et al. ................ 701/29 |
| 2005/0099185 A1 | 5/2005 | Klang |
| 2005/0102073 A1 | 5/2005 | Ingram ....................... 701/29 |
| 2005/0119809 A1 | 6/2005 | Chen .......................... 701/33.5 |
| 2005/0128083 A1 | 6/2005 | Puzio et al. ................ 340/572.1 |
| 2005/0128902 A1 | 6/2005 | Tsai ............................ 369/44.32 |
| 2005/0133245 A1 | 6/2005 | Katsuyama ................. 174/74 R |
| 2005/0134282 A1 | 6/2005 | Averbuch .................... 324/426 |
| 2005/0143882 A1 | 6/2005 | Umezawa ................... 701/29 |
| 2005/0159847 A1 | 7/2005 | Shah et al. .................. 700/276 |
| 2005/0162172 A1 | 7/2005 | Bertness ..................... 324/426 |
| 2005/0168226 A1 | 8/2005 | Quint et al. ................. 324/426 |
| 2005/0173142 A1 | 8/2005 | Cutler et al. ................ 173/181 |
| 2005/0182536 A1 | 8/2005 | Doyle et al. ................ 701/29 |
| 2005/0184732 A1 | 8/2005 | Restaino ..................... 324/426 |
| 2005/0192045 A1 | 9/2005 | Lowles |
| 2005/0206346 A1 | 9/2005 | Smith et al. |
| 2005/0212521 A1 | 9/2005 | Bertness et al. ............ 324/426 |
| 2005/0213874 A1 | 9/2005 | Kline .......................... 385/15 |
| 2005/0214144 A1 | 9/2005 | Yoshida |
| 2005/0218902 A1 | 10/2005 | Restaino et al. ............ 324/433 |
| 2005/0231205 A1 | 10/2005 | Bertness et al. ............ 324/426 |
| 2005/0254106 A9 | 11/2005 | Silverbrook et al. ....... 358/539 |
| 2005/0256617 A1 | 11/2005 | Cawthorne et al. ......... 701/22 |
| 2005/0258241 A1 | 11/2005 | McNutt et al. .............. 235/385 |
| 2005/0264296 A1 | 12/2005 | Philbrook ................... 324/433 |
| 2005/0269880 A1 | 12/2005 | Konishi ...................... 307/10.7 |
| 2005/0273218 A1 | 12/2005 | Breed ......................... 701/2 |
| 2006/0012330 A1 | 1/2006 | Okumura et al. ........... 320/103 |
| 2006/0017447 A1 | 1/2006 | Bertness ..................... 324/538 |
| 2006/0026017 A1 | 2/2006 | Walkder ..................... 701/31.4 |
| 2006/0030980 A1 | 2/2006 | St. Denis .................... 701/29 |
| 2006/0038572 A1 | 2/2006 | Philbrook |
| 2006/0043976 A1 | 3/2006 | Gervais ....................... 324/508 |
| 2006/0061469 A1 | 3/2006 | Jaeger ......................... 340/539.13 |
| 2006/0076923 A1 | 4/2006 | Eaves .......................... 320/112 |
| 2006/0079203 A1 | 4/2006 | Nicolini ...................... 455/411 |
| 2006/0089767 A1 | 4/2006 | Sowa .......................... 701/29 |
| 2006/0090554 A1 | 5/2006 | Krampitz |
| 2006/0090555 A1 | 5/2006 | Krampitz |
| 2006/0091597 A1 | 5/2006 | Opsahl |
| 2006/0092584 A1 | 5/2006 | Raichle |
| 2006/0095230 A1 | 5/2006 | Grier et al. ................. 702/183 |
| 2006/0102397 A1 | 5/2006 | Buck ........................... 429/432 |
| 2006/0125482 A1 | 6/2006 | Klang |
| 2006/0136119 A1 | 6/2006 | Raichle |
| 2006/0139167 A1 | 6/2006 | Davie |
| 2006/0152224 A1 | 7/2006 | Kim et al. ................... 324/430 |
| 2006/0155439 A1 | 7/2006 | Slawinski ................... 701/33.4 |
| 2006/0161313 A1 | 7/2006 | Rogers et al. .............. 701/1 |
| 2006/0161390 A1 | 7/2006 | Namaky et al. ............ 702/183 |
| 2006/0217914 A1 | 9/2006 | Bertness ..................... 702/113 |
| 2006/0244456 A1 | 11/2006 | Henningson |
| 2006/0244457 A1 | 11/2006 | Henningson et al. ....... 324/426 |
| 2006/0282227 A1 | 12/2006 | Bertness |
| 2006/0282323 A1 | 12/2006 | Walker et al. .............. 705/14 |
| 2007/0005201 A1 | 1/2007 | Chenn ......................... 701/31.5 |
| 2007/0024460 A1 | 2/2007 | Clark .......................... 340/663 |
| 2007/0026916 A1 | 2/2007 | Juds et al. ................... 463/1 |
| 2007/0046261 A1 | 3/2007 | Porebski .................... 320/132 |
| 2007/0082652 A1 | 4/2007 | Hartigan |
| 2007/0088472 A1 | 4/2007 | Ganzhorn et al. .......... 701/33 |
| 2007/0108942 A1 | 5/2007 | Johnson et al. ............. 320/112 |
| 2007/0159177 A1 | 7/2007 | Bertness et al. ............ 324/426 |
| 2007/0182576 A1 | 8/2007 | Proska et al. ............... 340/636.1 |
| 2007/0194791 A1 | 8/2007 | Huang ........................ 324/430 |
| 2007/0194793 A1 | 8/2007 | Bertness ..................... 324/503 |
| 2007/0205752 A1 | 9/2007 | Leigh ......................... 324/500 |
| 2007/0205983 A1 | 9/2007 | Naimo ........................ 345/160 |
| 2007/0210801 A1 | 9/2007 | Krampitz .................... 324/426 |
| 2007/0244660 A1 | 10/2007 | Bertness |
| 2007/0259256 A1 | 11/2007 | Le Canut et al. ........... 429/90 |
| 2007/0279066 A1 | 12/2007 | Chism ......................... 324/437 |
| 2008/0023547 A1 | 1/2008 | Raichle ....................... 235/462.13 |
| 2008/0036421 A1 | 2/2008 | Seo et al. .................... 320/132 |
| 2008/0053716 A1 | 3/2008 | Scheucher .................. 180/2.1 |
| 2008/0059014 A1 | 3/2008 | Nasr et al. .................. 701/22 |
| 2008/0064559 A1 | 3/2008 | Cawthorne .................. 477/5 |
| 2008/0086246 A1 | 4/2008 | Bolt et al. ................... 701/29 |
| 2008/0087479 A1 | 4/2008 | Kang |
| 2008/0094068 A1 | 4/2008 | Scott .......................... 324/426 |
| 2008/0103656 A1 | 5/2008 | Lipscomb ................... 701/33.4 |
| 2008/0106267 A1 | 5/2008 | Bertness ..................... 320/112 |
| 2008/0169818 A1 | 7/2008 | Lesesky et al. ............. 324/426 |
| 2008/0179122 A1 | 7/2008 | Sugawara ................... 180/65.245 |
| 2008/0194984 A1 | 8/2008 | Keefe ......................... 600/559 |
| 2008/0238357 A1 | 10/2008 | Bourilkov et al. |
| 2008/0252437 A1* | 10/2008 | Bertness ................ B60Q 1/543 |
| | | 340/636.15 |
| 2008/0256815 A1 | 10/2008 | Schafer |
| 2008/0303528 A1 | 12/2008 | Kim ............................ 324/430 |
| 2008/0303529 A1 | 12/2008 | Nakamura et al. .......... 324/433 |
| 2008/0315830 A1 | 12/2008 | Bertness ..................... 320/104 |
| 2009/0006476 A1 | 1/2009 | Andreasen et al. ......... 707/104.1 |
| 2009/0011327 A1 | 1/2009 | Okumura et al. ........... 429/99 |
| 2009/0013521 A1 | 1/2009 | Okumura et al. ........... 29/730 |
| 2009/0024266 A1 | 1/2009 | Bertness ..................... 701/22 |
| 2009/0024419 A1 | 1/2009 | McClellan .................. 705/4 |
| 2009/0085571 A1 | 4/2009 | Bertness ..................... 324/426 |
| 2009/0146610 A1 | 6/2009 | Trigiani |
| 2009/0146800 A1 | 6/2009 | Grimlund et al. ........... 340/505 |
| 2009/0160395 A1 | 6/2009 | Chen .......................... 320/101 |
| 2009/0184165 A1 | 7/2009 | Bertness et al. |
| 2009/0198372 A1 | 8/2009 | Hammerslag ............... 700/226 |
| 2009/0203247 A1 | 8/2009 | Fifelski ....................... 439/345 |
| 2009/0237029 A1 | 9/2009 | Andelfinger ................ 320/108 |
| 2009/0237086 A1 | 9/2009 | Andelfinger ................ 324/431 |
| 2009/0247020 A1 | 10/2009 | Gathman et al. ........... 439/759 |
| 2009/0251151 A1 | 10/2009 | Miyashita |
| 2009/0259432 A1 | 10/2009 | Liberty ....................... 702/150 |
| 2009/0265121 A1 | 10/2009 | Rocci .......................... 702/57 |
| 2009/0273451 A1 | 11/2009 | Soppera et al. |
| 2009/0276115 A1 | 11/2009 | Chen .......................... 701/32 |
| 2009/0311919 A1 | 12/2009 | Smith ......................... 439/759 |
| 2010/0023198 A1 | 1/2010 | Hamilton .................... 701/29 |
| 2010/0039065 A1 | 2/2010 | Kinkade ..................... 320/104 |
| 2010/0052193 A1 | 3/2010 | Sylvester .................... 261/26 |
| 2010/0066283 A1 | 3/2010 | Kitanaka .................... 318/400.02 |
| 2010/0088050 A1 | 4/2010 | Keuss .......................... 702/63 |
| 2010/0094496 A1 | 4/2010 | Hershkovitz et al. |
| 2010/0117603 A1 | 5/2010 | Makhija ...................... 320/162 |
| 2010/0145780 A1 | 6/2010 | Nishikawa et al. ......... 705/14.11 |
| 2010/0214055 A1 | 8/2010 | Fuji ............................ 340/3.1 |
| 2010/0265131 A1 | 10/2010 | Fabius |
| 2010/0314950 A1 | 12/2010 | Rutkowski et al. ......... 307/125 |
| 2011/0004427 A1 | 1/2011 | Gorbold et al. ............. 702/63 |
| 2011/0015815 A1 | 1/2011 | Bertness ..................... 701/22 |
| 2011/0106280 A1 | 5/2011 | Zeier .......................... 700/90 |
| 2011/0127960 A1 | 6/2011 | Plett |
| 2011/0161025 A1 | 6/2011 | Tomura ...................... 702/63 |
| 2011/0215767 A1 | 9/2011 | Johnson et al. ............. 320/136 |
| 2011/0218747 A1 | 9/2011 | Bertness ..................... 702/63 |
| 2011/0258112 A1 | 10/2011 | Eder et al. |
| 2011/0265025 A1 | 10/2011 | Bertness |
| 2011/0267067 A1 | 11/2011 | Bertness et al. |
| 2011/0273181 A1 | 11/2011 | Park et al. ................... 324/429 |
| 2011/0294367 A1 | 12/2011 | Moon ......................... 439/878 |
| 2011/0300416 A1 | 12/2011 | Bertness |
| 2012/0041697 A1 | 2/2012 | Stukenberg ................. 702/63 |
| 2012/0046807 A1 | 2/2012 | Ruther ........................ 701/2 |
| 2012/0046824 A1 | 2/2012 | Ruther et al. ............... 701/31.5 |

(56) References Cited

U.S. PATENT DOCUMENTS

| | | | |
|---|---|---|---|
| 2012/0062237 A1 | 3/2012 | Robinson | 324/433 |
| 2012/0074904 A1 | 3/2012 | Rutkowski et al. | 320/112 |
| 2012/0086399 A1 | 4/2012 | Choi | |
| 2012/0091962 A1 | 4/2012 | DeFrank et al. | |
| 2012/0116391 A1 | 5/2012 | Houser | 606/41 |
| 2012/0182132 A1 | 7/2012 | McShane | |
| 2012/0249069 A1 | 10/2012 | Ohtomo | 320/109 |
| 2012/0256494 A1 | 10/2012 | Kesler | 307/104 |
| 2012/0256568 A1 | 10/2012 | Lee | 318/139 |
| 2012/0274331 A1 | 11/2012 | Liu | 324/426 |
| 2012/0293372 A1 | 11/2012 | Amendolare | 342/451 |
| 2013/0049678 A1 | 2/2013 | Li | |
| 2013/0099747 A1 | 4/2013 | Baba | 310/118 |
| 2013/0106362 A1 | 5/2013 | Mackintosh et al. | |
| 2013/0106596 A1 | 5/2013 | Mouchet | |
| 2013/0115821 A1 | 5/2013 | Golko | 439/638 |
| 2013/0134926 A1 | 5/2013 | Yoshida | |
| 2013/0158782 A1 | 6/2013 | Bertness et al. | 701/34.4 |
| 2013/0172019 A1 | 7/2013 | Youssef | 455/456.6 |
| 2013/0200855 A1 | 8/2013 | Christensen et al. | |
| 2013/0218781 A1 | 8/2013 | Simon | |
| 2013/0288706 A1 | 10/2013 | Yu | 455/456.1 |
| 2013/0297247 A1 | 11/2013 | Jardine | |
| 2013/0311124 A1 | 11/2013 | Van Bremen | 702/104 |
| 2013/0314041 A1 | 11/2013 | Proebstle | 320/109 |
| 2013/0325405 A1 | 12/2013 | Miller | |
| 2014/0002021 A1 | 1/2014 | Bertness | |
| 2014/0002094 A1 | 1/2014 | Champlin | 324/426 |
| 2014/0029308 A1 | 1/2014 | Cojocaru | 363/13 |
| 2014/0081527 A1 | 3/2014 | Miller | |
| 2014/0091762 A1 | 4/2014 | Kondo | |
| 2014/0099830 A1 | 4/2014 | Byrne | 439/638 |
| 2014/0117997 A1 | 5/2014 | Bertness | 324/426 |
| 2014/0132223 A1 | 5/2014 | Kerfoot, Jr. | |
| 2014/0145670 A1 | 5/2014 | van Zwan et al. | |
| 2014/0194084 A1 | 7/2014 | Noonan | 455/404.1 |
| 2014/0225622 A1 | 8/2014 | Kudo | 324/433 |
| 2014/0239964 A1 | 8/2014 | Gach | 324/433 |
| 2014/0260577 A1 | 9/2014 | Chinnadurai | |
| 2014/0266061 A1 | 9/2014 | Wachal | |
| 2014/0278159 A1 | 9/2014 | Chinnadurai | |
| 2014/0333313 A1 | 11/2014 | Surampudi | |
| 2014/0354237 A1 | 12/2014 | Cotton | |
| 2014/0368156 A1 | 12/2014 | Aloe | |
| 2014/0374475 A1 | 12/2014 | Kallfelz et al. | |
| 2015/0093922 A1 | 4/2015 | Bosscher | 439/39 |
| 2015/0115720 A1 | 4/2015 | Hysell | 307/65 |
| 2015/0166518 A1 | 6/2015 | Boral et al. | |
| 2015/0168499 A1 | 6/2015 | Palmisano | |
| 2015/0221135 A1 | 8/2015 | Hill | 345/633 |
| 2015/0239365 A1 | 8/2015 | Hyde et al. | |
| 2015/0353192 A1 | 12/2015 | Morrison | |
| 2016/0011271 A1 | 1/2016 | Bertness | |
| 2016/0013523 A1 | 1/2016 | Anzicek | |
| 2016/0091571 A1 | 3/2016 | Salo, III | |
| 2016/0154044 A1 | 6/2016 | Bertness | |
| 2016/0171799 A1 | 6/2016 | Bertness | |
| 2016/0216335 A1 | 7/2016 | Bertness | |
| 2016/0226280 A1 | 8/2016 | Noor et al. | |
| 2016/0232736 A1 | 8/2016 | Holtappels | |
| 2016/0238667 A1 | 8/2016 | Palmisano et al. | |
| 2016/0253852 A1 | 9/2016 | Bertness et al. | |
| 2016/0266212 A1 | 9/2016 | Carlo | |
| 2016/0285284 A1 | 9/2016 | Matlapudi et al. | |
| 2016/0321897 A1 | 11/2016 | Lee | |
| 2016/0336623 A1 | 11/2016 | Nayar | |
| 2017/0093056 A1 | 3/2017 | Salo, III et al. | |
| 2017/0146602 A1 | 5/2017 | Samp | |
| 2017/0158058 A1 | 6/2017 | Lee et al. | |
| 2017/0373410 A1 | 12/2017 | Lipkin et al. | |
| 2018/0009328 A1 | 1/2018 | Hinterberger et al. | |
| 2018/0113171 A1 | 4/2018 | Bertness | |
| 2018/0301913 A1 | 10/2018 | Irish et al. | |
| 2018/0306867 A1 | 10/2018 | Bertness | |
| 2019/0036256 A1* | 1/2019 | Martens | H01R 13/658 |
| 2019/0105998 A1 | 4/2019 | Bertness | |
| 2019/0152332 A1 | 5/2019 | Bertness | |
| 2019/0154763 A1 | 5/2019 | Bertness | |
| 2019/0204392 A1 | 7/2019 | Bertness | |
| 2020/0086757 A1 | 3/2020 | Vain et al. | |
| 2020/0161630 A1 | 5/2020 | Zeng | |
| 2020/0174078 A1 | 6/2020 | Salo, III et al. | |
| 2020/0274370 A1 | 8/2020 | Krieg | |
| 2021/0048374 A1 | 2/2021 | Sampson et al. | |
| 2021/0049480 A1 | 2/2021 | Kale et al. | |
| 2021/0135462 A1 | 5/2021 | Sampson et al. | |
| 2021/0141021 A1 | 5/2021 | Salo, III et al. | |
| 2021/0141043 A1 | 5/2021 | Bertness | |
| 2021/0203016 A1* | 7/2021 | Bertness | B60L 3/12 |
| 2021/0231737 A1 | 7/2021 | Salo, III et al. | |
| 2021/0325471 A1 | 10/2021 | Bertness | |
| 2022/0050142 A1 | 2/2022 | Bertness | |
| 2022/0258619 A1 | 8/2022 | Bertness | |
| 2022/0384858 A1 | 12/2022 | Bertness | |
| 2023/0063349 A1 | 3/2023 | Bertness et al. | |
| 2023/0256829 A1 | 8/2023 | Bertness | |
| 2023/0333171 A1 | 10/2023 | Bertness | |
| 2023/0358818 A1 | 11/2023 | Kolamkar et al. | |
| 2023/0387707 A1 | 11/2023 | Bertness | |
| 2023/0391179 A1 | 12/2023 | Sampson et al. | |

FOREIGN PATENT DOCUMENTS

| | | |
|---|---|---|
| CN | 103091633 | 5/2013 |
| CN | 206658084 | 11/2017 |
| CN | 109683054 | 4/2019 |
| DE | 29 26 716 B1 | 1/1981 |
| DE | 40 07 883 | 9/1991 |
| DE | 196 38 324 | 9/1996 |
| DE | 601 12 502 T2 | 6/2006 |
| DE | 10 2009 013 857 | 10/2009 |
| DE | 10 2008 036 595 A1 | 2/2010 |
| DE | 10 2018 001885 | 9/2018 |
| EP | 0 022 450 A1 | 1/1981 |
| EP | 0 391 694 A2 | 4/1990 |
| EP | 0 476 405 A1 | 9/1991 |
| EP | 0 637 754 A1 | 2/1995 |
| EP | 0 772 056 A1 | 5/1997 |
| EP | 0 982 159 A2 | 3/2000 |
| EP | 1 810 869 A1 | 11/2004 |
| EP | 1 786 057 | 5/2007 |
| EP | 1 807 710 B1 | 7/2007 |
| EP | 1 807 710 | 1/2010 |
| EP | 2 302 724 | 3/2011 |
| FR | 2 749 397 | 12/1997 |
| GB | 154 016 | 11/1920 |
| GB | 2 029 586 | 3/1980 |
| GB | 2 088 159 A | 6/1982 |
| GB | 2 246 916 A | 10/1990 |
| GB | 2 266 150 | 10/1993 |
| GB | 2 275 783 A | 7/1994 |
| GB | 2 353 367 | 2/2001 |
| GB | 2 387 235 A | 10/2003 |
| JP | 59-17892 | 1/1984 |
| JP | 59-17893 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04095788 | 3/1992 |
| JP | 04131779 | 5/1992 |
| JP | 04372536 | 12/1992 |
| JP | 05211724 A | 8/1993 |
| JP | 5216550 | 8/1993 |
| JP | 7-128414 | 5/1995 |
| JP | 09061505 | 3/1997 |
| JP | 10056744 | 2/1998 |
| JP | 10232273 | 9/1998 |
| JP | 11103503 A | 4/1999 |
| JP | 11-150809 | 6/1999 |

(56) References Cited

FOREIGN PATENT DOCUMENTS

| | | |
|---|---|---|
| JP | 11-271409 | 10/1999 |
| JP | 2001-023037 | 1/2001 |
| JP | 2001057711 A | 2/2001 |
| JP | 2003-346909 | 12/2003 |
| JP | 2005-238969 | 9/2005 |
| JP | 2006/242674 | 9/2006 |
| JP | 2006331976 A | 12/2006 |
| JP | 2009-244166 | 10/2009 |
| JP | 2009-261174 | 11/2009 |
| JP | 2010-172122 | 5/2010 |
| JP | 2010-172142 | 8/2010 |
| RU | 2089015 C1 | 8/1997 |
| WO | WO 93/22666 | 11/1993 |
| WO | WO 94/05069 | 3/1994 |
| WO | WO 96/01456 | 1/1996 |
| WO | WO 96/06747 | 3/1996 |
| WO | WO 96/28846 | 9/1996 |
| WO | WO 97/01103 | 1/1997 |
| WO | WO 97/44652 | 11/1997 |
| WO | WO 98/04910 | 2/1998 |
| WO | WO 98/21132 | 5/1998 |
| WO | WO 98/58270 | 12/1998 |
| WO | WO 99/23738 | 5/1999 |
| WO | WO 99/56121 | 11/1999 |
| WO | WO 00/16083 | 3/2000 |
| WO | WO 00/62049 | 10/2000 |
| WO | WO 00/67359 | 11/2000 |
| WO | WO 01/59443 | 2/2001 |
| WO | WO 01/16614 | 3/2001 |
| WO | WO 01/16615 | 3/2001 |
| WO | WO 01/51947 | 7/2001 |
| WO | WO 03/047064 A3 | 6/2003 |
| WO | WO 03/076960 A1 | 9/2003 |
| WO | WO 2004/047215 A1 | 6/2004 |
| WO | WO 2007/059935 | 5/2007 |
| WO | WO 2007/075403 | 7/2007 |
| WO | WO 2009/004001 | 1/2009 |
| WO | WO 2010/007681 | 1/2010 |
| WO | WO 2010/035605 | 4/2010 |
| WO | WO 2010/042517 | 4/2010 |
| WO | WO 2011/153419 | 12/2011 |
| WO | WO 2012/078921 | 6/2012 |
| WO | WO 2013/070850 | 5/2013 |

OTHER PUBLICATIONS

"Battery Impedance", by E. Willihnganz et al., *Electrical Engineering*, Sep. 1959, pp. 922-925.
"Determining The End of Battery Life", by S. DeBardelaben, *IEEE*, 1986, pp. 365-368.
"A Look at the Impedance of a Cell", by S. Debardelaben, *IEEE*, 1988, pp. 394-397.
"The Impedance of Electrical Storage Cells", by N.A. Hampson et al., *Journal of Applied Electrochemistry*, 1980, pp. 3-11.
"A Package for Impedance/Admittance Data Analysis", by B. Boukamp, *Solid State Ionics*, 1986, pp. 136-140.
"Precision of Impedance Spectroscopy Estimates of Bulk, Reaction Rate, and Diffusion Parameters", by J. Macdonald et al., *J. Electroanal, Chem.*, 1991, pp. 1-11.
International Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128,131.
IEEE Recommended Practice for Maintenance, Testings, and Replacement of Large Lead Storage Batteries for Generating Stations and Substations, *The Institute of Electrical and Electronics Engineers, Inc., ANSI/IEEE* Std. 450-1987, Mar. 9, 1987, pp. 7-15.
"Field and Laboratory Studies to Assess the State of Health of Valve-Regulated Lead Acid Batteries: Part I Conductance/Capacity Correlation Studies", by D. Feder et al., *IEEE*, Aug. 1992, pp. 218-233.
"JIS Japanese Industrial Standard-Lead Acid Batteries for Automobiles", *Japanese Standards Association UDC*, 621.355.2:69.113. 006, Nov. 1995.
"Performance of Dry Cells", by C. Hambuechen, Preprint of *Am. Electrochem. Soc.*, Apr. 18-20, 1912, paper No. 19, pp. 1-5.
"A Bridge for Measuring Storage Battery Resistance", by E. Willihncanz, *The Electrochemical Society*, preprint 79-20, Apr. 1941, pp. 253-258.
National Semiconductor Corporation, "High Q Notch Filter", 3/69, Linear Brief 5, Mar. 1969.
Burr-Brown Corporation, "Design A 60 Hz Notch Filter with the UAF42", 1/94, AB-071, 1994.
National Semiconductor Corporation, "LMF90-$4^{th}$-Order Elliptic Notch Filter", 12/94, RRD-B30M115, Dec. 1994.
"Alligator Clips with Wire Penetrators" *J. S. Popper, Inc.* product information, downloaded from http://www.jspopper.com/, prior to Oct. 1, 2002.
"#12: LM78S40 Simple Switcher DC to DC Converter", *ITM e-Catalog*, downloaded from http://www.pcbcafe.com, prior to Oct. 1, 2002.
"Simple DC-DC Converts Allows Use of Single Battery", *Electronix Express*, downloaded from http://www.elexp.com/t_dc-dc.htm, prior to Oct. 1, 2002.
"DC-DC Converter Basics", *Power Designers*, downloaded from http://www.powerdesigners.com/InforWeb.design_center/articles/DC-DC/converter.shtm, prior to Oct. 1, 2002.
"Notification of Transmittal of The International Search Report or the Declaration", PCT/US02/29461, filed Sep. 17, 2002 and mailed Jan. 3, 2003.
"Notification of Transmittal of The International Search Report or the Declaration", PCT/US03/07546, filed Mar. 13, 2003 and mailed Jul. 4, 2001.
"Notification of Transmittal of The International Search Report or the Declaration", PCT/US03/06577, filed Mar. 5, 2003 and mailed Jul. 24, 2003.
"Notification of Transmittal of The International Search Report or the Declaration", PCT/US03/07837, filed Mar. 14, 2003 and mailed Jul. 4, 2003.
"Improved Impedance Spectroscopy Technique for Status Determination of Production Li/$SO_2$ Batteries" Terrill Atwater et al., pp. 10-113, (1992).
"Notification of Transmittal of The International Search Report or the Declaration", PCT/US03/41561; Search Report completed Apr. 13, 2004, mailed May 6, 2004.
"Notification of Transmittal of The International Search Report of the Declaration", PCT/US03/27696, filed Sep. 4, 2003 and mailed Apr. 15, 2004.
"Programming Training Course, 62-000 Series Smart Engine Analyzer", Testproducts Division, Kalamazoo, Michigan, pp. 1-207, (1984).
"Operators Manual, Modular Computer Analyzer Model MCA 3000", Sun Electric Corporation, Crystal Lake, Illinois, pp. 1-1-14-13, (1991).
Supplementary European Search Report Communication for Appl. No. 99917402.2; Sep. 7, 2004.
"Dynamic modelling of lead/acid batteries using impedance spectroscopy for parameter identification", Journal of Power Sources, pp. 69-84, (1997).
Notification of Transmittal of the International Search Report for PCT/US03/30707, filed Sep. 30, 2003 and mailed Nov. 24, 2004.
"A review of impedance measurements for determination of the state-of-charge or state-of-health of secondary batteries", Journal of Power Sources, pp. 59-69, (1998).
"Search Report Under Section 17" for Great Britain Application No. GB0421447. 4, date of search Jan. 27, 2005, date of document Jan. 28, 2005.
"Results of Discrete Frequency Immittance Spectroscopy (DFIS) Measurements of Lead Acid Batteries", by K.S. Champlin et al., *Proceedings of $23^{rd}$ International Teleco Conference (INTELEC)*, published Oct. 2001, IEE, pp. 433-440.
"Examination Report" from the UK Patent Office for App. No. 0417678. 0; Jan. 24, 2005.
Wikipedia Online Encyclopedia, Inductance, 2005, http://en.wikipedia.org/wiki/inductance, pp. 1-5, mutual Inductance, pp. 3,4.
"Professional BCS System Analyzer Battery-Charger-Starting", pp. 2-8, (2001).

(56) References Cited

OTHER PUBLICATIONS

Young Illustrated Encyclopedia Dictionary of Electronics, 1981, Parker Publishing Company, Inc., pp. 318-319.
"DSP Applications in Hybrid Electric Vehicle Powertrain", Miller et al., Proceedings of the American Control Conference, San Diego, CA, Jun. 1999; 2 ppg.
"Notification of Transmittal of the International Search Report and the Written Opinion of the International Searching Authority, or the Declaration" for PCT/US2008/008702 filed Jul. 2008; 15 pages.
"A Microprocessor-Based Control System for a Near-Term Electric Vehicle", Bimal K. Bose; IEEE Transactions on Industry Applications, vol. IA-17, No. 6, Nov./Dec. 1981; 0093-9994/81/1100-0626$00.75 © 1981 IEEE, 6 pages.
Notification of Transmittal of the International Search Report and the Written Opinion of the International *Searching* Authority, or the Declaration for PCT/US2011/038279 filed May 27, 2011, date of mailing Sep. 16, 2011, 12 pages.
U.S. Appl. No. 60/387,912, filed Jun. 13, 2002 which is related to U.S. Pat. No. 7,089,127.
"Conductance Testing Compared to Traditional Methods of Evaluating the Capacity of Valve-Regulated Lead-Acid Batteries and Predicting State-of-Health", by D. Feder et al., May 1992, pp. 1-8; (13 total pgs.).
"Field and Laboratory Studies to Assess the State of Health of Valve-Regulated Lead Acid Batteries: Part I-Conductance/Capacity Correlation Studies", by D. Feder at al., Oct. 1992, pp. 1-15; (19 total pgs.).
"Field Application of Conductance Measurements Use to Ascertain Cell/Battery and Inter-Cell Connection State-of-Health in Electric Power Utility Applications", by M. Hlavac et al., Apr. 1993, pp. 1-14; (19 total pgs.).
"Conductance Testing of Standby Batteries in Signaling and Communications Applications for the Purpose of Evaluating Battery State-of-Health", by S. McShane, Apr. 1993, pp. 1-9; (14 total pgs.).
"Conductance Monitoring of Recombination Lead Acid Batteries", by B. Jones, May 1993, pp. 1-6; (11 total pgs.).
"Evaluating the State-of-Health of Lead Acid Flooded and Valve-Regulated Batteries: A Comparison of Conductance Testing vs. Traditional Methods", by M. Hlavac et al., Jun. 1993, pp. 1-15; (20 total pgs.).
"Updated State of Conductance/Capacity Correlation Studies to Determine the State-of-Health of Automotive SLI and Standby Lead Acid Batteries", by D. Feder et al., Sep. 1993, pp. 1-17; (22 total pgs.).
"Field and Laboratory Studies to Access the State-of-Health of Valve-Regulated Lead-Acid Battery Technologies Using Conductance Testing Part II—Further Conductance/Capacity Correlation Studies", by M. Hlavac et al., Sep. 1993, pp. 1-9; (14 total pgs.).
"Field Experience of Testing VRLA Batteries by Measuring Conductance", by M. W. Kniveton, May 1994, pp. 1-4; (9 total pgs.).
"Reducing the Cost of Maintaining VRLA Batteries in Telecom Applications", by M. W. Kniveton, Sep. 1994, pp. 1-5; (10 total pgs.).
"Analysis and Interpretation of Conductance Measurements used to Access the State-of- Health of Valve Regulated Lead Acid Batteries Part III: Analytical Techniques", by M. Hlavac, Nov. 1994, 9 pgs; (13 total pgs.).
"Testing 24 Volt Aircraft Batteries Using Midtronics Conductance Technology", by M. Hlavac et al., Jan. 1995, 9 pgs; (13 total pgs.).
"VRLA Battery Monitoring Using Conductance Technology Part IV: On-Line State-of-Health Monitoring and Thermal Runaway Detection/Prevention", by M. Hlavac et al., Oct. 1995, 9 pgs; (13 total pgs.).
"VRLA Battery Conductance Monitoring Part V: Strategies for VRLA Battery Testing and Monitoring in Telecom Operating Environments", by M. Hlavac et al., Oct. 1996, 9 pgs; (13 total pgs.).
"Midpoint Conductance Technology Used In Telecommunication Stationary Standby Battery Applications Part VI: Considerations for Deployment of Midpoint Conductance in Telecommunications Power Applications", by M. Troy et al., Oct. 1997, 9 pgs; (13 total pgs.).

"Impedance/Conductance Measurements as an Aid to Determining Replacement Strategies", M. Kniveton, Sep. 1998, pp. 297-301; (9 total pgs.).
"A Fundamentally New Approach to Battery Performance Analysis Using DFRA™M/DTIS™M Technology", by K. Champlin et al., Sep. 2000, 8 pgs; (12 total pgs.).
"Battery State of Health Monitoring, Combining Conductance Technology With Other Measurement Parameters for Real-Time Battery Performance Analysis", by D. Cox et al., Mar. 2000, 6 pgs; (10 total pgs.).
Search Report and Written Opinion from PCT Application No. PCT/US2011/026608, dated Aug. 29, 2011, 9 pgs.
Examination Report under section 18 (3) for corresponding Great Britain Application No. GB1000773.0, dated Feb. 6, 2012, 2 pages.
Communication from GB1216105.5, dated Sep. 21, 2012.
Notification of Transmittal of the International Search Report and Written Opinion from PCT/US2011/039043, dated Jul. 26, 2012.
Notification of Transmittal of the International Search Report and Written Opinion from PCT/US2011/053886, dated Jul. 27, 2012.
"Field Evaluation of Honda's Ev Plus Battery Packs", by A. Paryani, *IEEE AES Systems Magazine*, Nov. 2000, pp. 21-24.
Search Report from PCT/US2011/047354, dated Nov. 11, 2011.
Written Opinion from PCT/US2011/047354, dated Nov. 11, 2011.
First Office Action (Notification of Reasons for Rejections) dated Dec. 3, 2013 in related Japanese patent application No. 2013-513370, 9 pgs. Including English Translation.
Official Action dated Jan. 22, 2014 in Korean patent application No. 10-2012-7033020, 2 pgs including English Translation.
Official Action dated Feb. 20, 2014 in Korean patent application No. 10-2013-7004814, 6 pgs including English Translation.
First Office Action for Chinese Patent Application No. 201180011597.4, dated May 6, 2014, 20 pages.
Office Action from Korean Application No. 10/2012-7033020, dated Jul. 29, 2014.
Office Action for Chinese Patent Application No. 201180038844.X, dated Jul. 1, 2014.
Office Action for Chinese Patent Application No. 201180030045.8, dated Jul. 21, 2014.
Office Action for German Patent Application No. 1120111020643 dated Aug. 28, 2014.
Office Action from Japanese Patent Application No. 2013-513370, dated Aug. 5, 2014.
Office Action from Japanese Patent Application No. 2013-531839, dated Jul. 8, 2014.
Office Action for German Patent Application No. 103 32 625.1, dated Nov. 7, 2014, 14 pages.
Office Action from Chinese Patent Application No. 201180038844.X, dated Dec. 8, 2014.
Office Action from CN Application No. 201180011597.4, dated Jan. 6, 2015.
Office Action for Chinese Patent Application No. 201180030045.8, dated Mar. 24, 2015.
Office Action for Japanese Patent Application No. 2013-531839, dated Mar. 31, 2015.
Notification of Transmittal of the International Search Report and Written Opinion from PCT/US2014/069661, dated Mar. 26, 2015.
Office Action for Chinese Patent Application No. 201180038844.X, dated Jun. 8, 2015.
Office Action from Chinese Patent Application No. 201180011597.4 dated Jun. 3, 2015.
European Search Report from European Application No. EP 15151426.2, dated Jun. 1, 2015.
Notification of Transmittal of the International Search Report and the Written Opinion from PCT/US2016/014867, dated Jun. 3, 2016.
Office Action from Japanese Patent Application No. 2015-014002, dated Jul. 19, 2016.
Notification of Transmittal of the International Search Report and the Written Opinion of the International Searching Authority from PCT/US2016/029696, dated Aug. 24, 2016.
Office Action from German Patent Application No. 10393251.8, dated Nov. 4, 2016, including English translation.
Office Action from European Patent Application No. 15 151 426.2-1801, dated Aug. 28, 2017, 2 pages.

(56) References Cited

OTHER PUBLICATIONS

Office Action from German Patent Application No. 112011101892.4, dated Sep. 7, 2017.
Office Action from Japanese Patent Application No. 2017-026740, dated Jan. 9, 2018.
Office Action from Chinese Patent Application No. 201480066251.8, dated May 29, 2018.
Brochure: "Sensors Intelligent Battery Sensors, Measuring Battery Capacity and Ageing", by Hella, 6 pgs.
Office Action from Japanese Patent Application No. 2017-026740, dated May 8, 2018.
U.S. Appl. No. 12/697,485, filed Feb. 1, 2010, 36 pgs.
Office Action from Chinese Patent Application No. 201480066251.8, dated Dec. 13, 2018.
Notification of Transmittal of the International Search Report and the Written Opinion of the International Searching Authority, or the Declaration for PCT/US2019/014487, dated Apr. 11, 2019.
Notification of Transmittal of the International Search Report and the Written Opinion of the International Searching Authority, or the Declaration for PCT/US2019/014494, dated Apr. 24, 2019.
Office Action from German Patent Application No. 11 2011 101 892.4, dated Oct. 1, 2020, and translation using Google Translate.
Wikipedia Online Encyclopedia, https: // de.wikipedia.org/w/index.php?title=four-wire measurement & oldid=67143514-4 (Retrieved Sep. 15, 2020) along with Google Translation.
Notification of Transmittal of the International Search Report and the Written Opinion of the International Searching Authority, or the Declaration for PCT/US2020/059015, dated Jan. 22, 2021.
U.S. Appl. No. 17/504,897, filed Oct. 19, 2021.
Notification of Transmittal of the International Search Report and the Written Opinion of the International Searching Authority, or the Declaration for PCT/US2021/040313 dated Oct. 25, 2021; 14 pages.
U.S. Appl. No. 17/893,412, filed Aug. 23, 2022.
U.S. Appl. No. 17/750,719, filed May 23, 2022.
U.S. Appl. No. 18/328,827, filed Jun. 5, 2023.
U.S. Appl. No. 18/616,458, filed Mar. 26, 2024.
U.S. Appl. No. 18/609,344, filed Mar. 19, 2024.
U.S. Appl. No. 18/324,382, filed May 26, 2023.
U.S. Patent Office issued prosecution for U.S. Appl. No. 17/136,600, filed Dec. 29, 2020, including: Corrected Notice of Allowability issued Jan. 22, 2024, 2 pages; Corrected Notice of Allowability issued Jan. 19, 2024, 2 pages Notice of Allowance and Fees Due (PTOL-85) issued Jan. 9, 2024, 8 pages; Non-Final Rejection issued Jun. 5, 2023, 14 pages; Restriction issued Dec. 9, 2022, 6 pages; 32 pages total.

\* cited by examiner

INTELLIGENT MODULE INTERFACE FOR BATTERY MAINTENANCE DEVICE

CROSS-REFERENCE TO RELATED APPLICATION

The present application is a Divisional application which claims priority to U.S. application Ser. No. 17/136,600, filed Dec. 29, 2020 which is based on and claims the benefit of U.S. provisional patent application Ser. No. 62/955,805, filed Dec. 31, 2019, the contents of which are hereby incorporated by reference in their entirety.

BACKGROUND

The present invention relates to electric vehicles of the type which use battery packs for storing electricity which is used to power the vehicle. This includes both hybrid and purely electric vehicles. More specifically, the present invention relates to the maintenance of such battery packs used in electric vehicles.

Traditionally, automotive vehicles have used internal combustion engines as their power source. However, vehicles which are electrically powered are finding widespread use. Such vehicle can provide increased fuel efficiency and can be operated using alternative energy sources.

Some types of electric vehicles are completely powered using electric motors and electricity. Other types of electric vehicles include an internal combustion engine. The internal combustion engine can be used to generate electricity and supplement the power delivered by the electric motor. These types of vehicles are known as "hybrid" electric vehicles.

Operation of an electric vehicle requires a power source capable of providing large amounts of electricity. Typically, electric vehicles store electricity in large battery packs which consist of a plurality of batteries. These batteries may be formed by a number of individual cells, or may themselves be individual cells, depending on the configuration of the battery and battery pack. The packs are large, replacement can be expensive and they can be difficult to access and maintain.

Another requirement may be to discharge the battery down to a fixed state of charge, say 30%, for safe transport. It is desired to perform this work as quickly as possible and as safely as possible. Further, since this work often occurs outside and away from permanent structures, light weight portability and operation from batteries is required. These large batteries may have a fully charged voltage in the 400 VDC range, and can store as much as 100 KWh. Further, since this is an activity is infrequently performed, an inexpensive solution is desired.

SUMMARY

The present invention includes a battery pack maintenance device for performing maintenance on battery packs of hybrid and/or electrical vehicles (referred herein generally as electric vehicles). In various embodiments, the device includes one or more loads for connecting to a battery pack for use in discharging the battery pack, and/or charging circuitry for use in charging the battery pack. Optional input/output circuitry can be provided for communicating with circuitry of in the battery pack and/or circuitry of the vehicle. A method and device for determining connector configuration is also provided.

DETAILED DESCRIPTION OF ILLUSTRATIVE EMBODIMENTS

Figure 1:
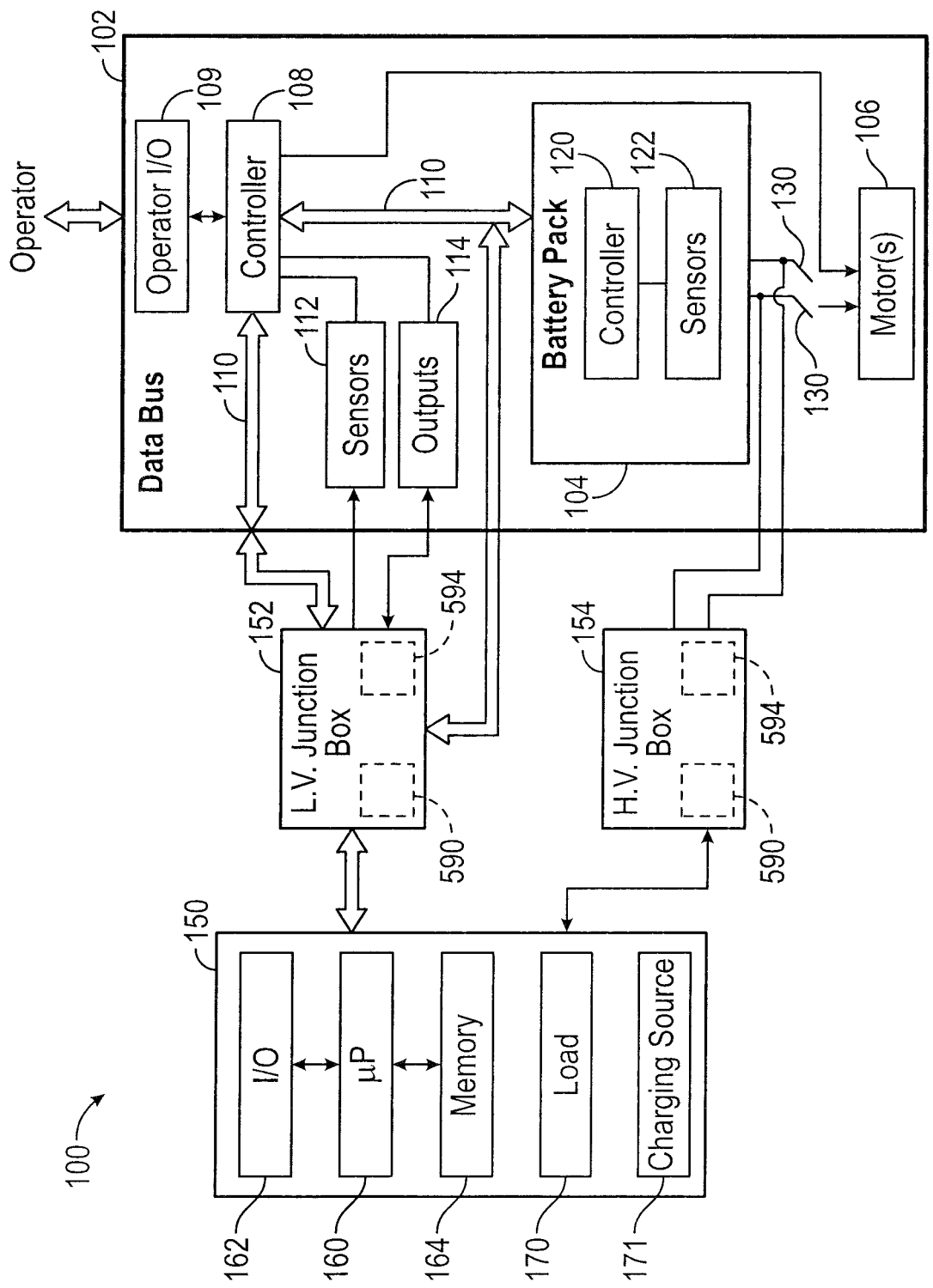
FIG. 1 is a simplified block diagram of a battery maintenance device in accordance with the present invention coupled to an electric vehicle.

Maintenance of automotive vehicles with internal combustion engines is a well-known art. Procedures are known for servicing the internal combustion engine of the vehicles, the drive train, the battery (which is generally used to start the vehicle and operate the electrical devices within the vehicle), and the fuel storage and distribution system. In contrast, widespread use of electrical vehicles is a relatively new phenomenon and there is an ongoing need for improved procedures for performing maintenance on the batteries of such vehicles. For example, when a traditional vehicle with an internal combustion engine is involved in an accident, it is typical to drain the gasoline or other fuel from the vehicle for safety purposes. In contrast, when an electrical vehicle is involved in an accident, the battery pack of the vehicle may contain a relatively large amount of energy, and may even be in a fully charged state. It is not at all apparent how the battery pack can be discharged as there are many different types of battery pack, as well as various techniques used to access the packs. Further, after an accident, systems of the vehicle may not be functioning properly and may prevent maintenance from being performed on the battery pack whereby the battery pack cannot be discharged using normal procedures. In one aspect, the present invention provides an apparatus and method for safely accessing the battery pack of an electrical vehicle and discharges the battery pack. However, the present invention is not limited to this configuration and may be used generally to perform maintenance on the battery pack of an electric vehicle.

The device of the present invention can be used to "de-power" the battery pack of an electric vehicle or provide other maintenance on the battery pack including charging the battery pack. In general, this activity can be problematic for a number of reasons. First, different types of electric vehicles use different types of battery packs. The configuration, voltages, and connection to such packs vary greatly. Further, the vehicle itself typically includes "intelligence" to control the charging and discharging, as well as monitoring the status of the battery pack. Further still, some battery packs themselves include "intelligence" to control the charging and discharging of the battery pack as well as monitor the status of the battery pack. The device of the present invention is capable of interfacing with a databus of the vehicle and/or a databus of the battery pack in order to control and monitor operation of the battery pack. Again, the connection to these databuses varies greatly between vehicles. Further still, the data format and specific data varies between vehicles. The problem of performing maintenance on a battery pack is exacerbated when a vehicle has been in an accident. The battery pack may be physically difficult to access and it may be difficult to obtain electrical connections to the battery pack and/or vehicle for discharging the battery as well as for communicating over the vehicle or battery pack databus. Depending on the damage which occurs during an accident, the battery pack may be isolated for safety reasons. This isolation presents another challenge in accessing the battery pack. Further, the circuitry of the maintenance device must be capable of operating with the relatively high DC voltages, for example 400 Volts, which are present in electrical vehicle battery packs. These high voltages must be isolated from the logic and control circuitry of the device as well as the operator. Additionally, in one aspect, the device also includes a charger function for use in charging some or all of the cells of a battery pack in order to place the battery pack into service.

Electric vehicles typically includes "contactors" which are electrically operated relays (switches) used to selectively couple the high voltage from the battery pack to the powerful electric motors used in the drive train of the vehicle. In order to access the battery pack from a location on the vehicle, it is necessary for these contactors to be closed to complete the electrical circuit. However, in an accident, the controlling electronics of the vehicle and/or battery pack will typically disconnect (open) the contactors for safety purposes in order to isolate the battery pack from the vehicle. Thus, in one embodiment, the present invention communicates with the controller of the electrical vehicle or battery pack, or directly with the contactors, to cause the contactors to close and thereby provide access to the high voltage of the battery pack. When communicating with the control system of the vehicle, the device of the present invention can provide information to the vehicle system indicating that it is appropriate for the contactors to close. Thus, failure indications or other errors, including errors associated with a vehicle being in an accident, must be suppressed. Instead, information is provided to the vehicle system by the battery pack maintenance device which indicates that it is appropriate for the contactors to be closed.

When servicing battery packs on electrified vehicles, including HEV, PHEV, and BEV, common operations are pack or module charge, pack or module discharge, and pack or module balance. During these operations, it is frequently desired to monitor the individual cell voltages and temperatures contained within the pack or module. Packs and modules generally consist of a plurality of series, parallel, or series/parallel connections of cells.

These cell voltages and temperatures can be obtained from on-module electronics, in which case a communication link is used to monitor the voltages.

However, more commonly, a connector is presented on the battery module which contains nodes which are tied to the individual cell connections. Electronics within the battery structure connects through cabling to monitor the cell voltages and temperatures for normal vehicle operation.

FIG. 1 is a simplified block diagram showing battery pack maintenance device 100 coupled to an electric vehicle 102. The vehicle 102 is illustrated in a simple block diagram and includes a battery pack 104 used to power the vehicle 102 including providing power to motor(s) 106 of the vehicle. The vehicle 102 includes a vehicle controller 108 coupled to a databus 110 of the vehicle. The controller 108 receives information regarding operation of the vehicle through sensors 112 and controls operation of the vehicle through outputs 114. Further, the battery pack 104 is illustrated as including its own optional controller 120 which monitors operation of the battery pack 104 using battery pack sensors 122.

Many semiconductor manufacturers produce highly integrated silicon circuits designed to monitor the many cell voltages and temperatures present. These devices work well in the intended application, as they have very specific polarity and cell voltage limits, but the chassis wiring of the battery pack ensures that no improper connections can be made. When connecting battery maintenance equipment to the battery module, it is important that the correct connection is used. If connected incorrectly, the voltages present on the module can damage the maintenance equipment. This requires the operator to ensure that the correct connector/wiring harness is chosen. If the incorrect connector/wiring harness is chosen, incorrect measurements/charging can occur. In some cases the maintenance equipment can be damaged.

During operation, the electric vehicle 102 is controlled by the controller 108, for example, based upon input from a driver through operator I/O 109. Operator I/O 109 can comprise, for example, a foot accelerator input, a brake input, an input indicating an position of a steering wheel, information related to a desired gearing ratio for a drive train, outputs related to operation of the vehicle such as speed, charging information, amount of energy which remains in the battery pack 104, diagnostic information, etc. The controller 108 can control operation of the electric motors 106 to propel the vehicle, as well as monitor and control other systems of the vehicle 102. The controller 120 of battery pack 104 can be used to monitor the operation of the battery pack 104. For example, the sensors 122 may include temperature sensors configured to disconnect the batteries of the battery pack if a threshold temperature is exceeded. Other example sensors include current or voltage sensors, which can be used to monitor charge of the battery pack 104. FIG. 1 also illustrates contactor relays 130 of the vehicle 102 which are used to selectively decouple the battery pack 104 from systems of the vehicle 102 as discussed above. For example, the controller 108 can provide a signal to cause the contactors 130 to close thereby connecting the battery pack 104 to electrical systems of the vehicle 102.

Battery pack maintenance device 100 includes a main unit 150 which couples to the vehicle through a low voltage junction box 152 and a high voltage junction box 154. These junction boxes 152, 154 are optional and other techniques may be used for coupling the maintenance device 100 to the vehicle 102. Maintenance device 100 includes a microprocessor 160, I/O circuitry 162 and memory 164 which contains, for example, programming instructions for use by microprocessor 160. The I/O circuitry 162 can be used to both user input, output, remote input, output as well as input and output with vehicle 102. The maintenance device 100 includes a controllable load 170 for use in discharging the battery pack 104. An optional charging source 171 is also provided and can be used in situations in which it is desirable to charge the battery pack 104, for example, to perform maintenance on the battery pack 104. The high voltage junction box 154 is used to provide an electrical connection between terminals of the battery pack 104 and the maintenance device main unit 150. Using this connection, batteries within the battery pack 104 can be discharged using the load 170 or charged using the charging source 171. Similarly, low voltage junction box 152 is used by battery pack maintenance device 100 to couple to low voltage systems of the electric vehicle 102. Such systems include the databus 110 of the vehicle, sensors 112, outputs 114, etc. Through this connection, as discussed above, the maintenance device 100 can gather information regarding the condition of systems within the vehicle 102 including the battery pack 104, and can control operation of systems within the vehicle 102. Similarly, through this connection, the outputs from sensors 112 can be changed or altered whereby altered sensor outputs can be provided to controller 108. This can be used, for example, to cause controller 108 to receive information indicating that the vehicle 102 or battery pack 104 is in a condition which is different than from what the sensors 112 are actually sensing. For example, this connection can be used to cause the contactors 130 to close to thereby provide an electrical connection to the battery pack 104. Further, the low voltage junction box 152 can be used to couple to the controller 120 and/or sensors 122 of the battery pack 104. The junction boxes 152, 154 couple to vehicle 102 through the use of an appropriate connector. The particular connector which is used can be selected based upon the specific type of vehicle 102 and the type of connections which are available to an operator. For example, OBD II connection can be used to couple to the databus 110 of the vehicle. Other plugs or adapters may be used to couple to sensors 112 or outputs 114. A particularly style plug may be available for coupling the high voltage junction box 154 to the battery pack 104. If there are no contactors which are available or if they cannot be accessed or are unresponsive, in one configuration clips or other types of clamp on or selectively connectable contactors can be used to perform the coupling.

Figure 2:
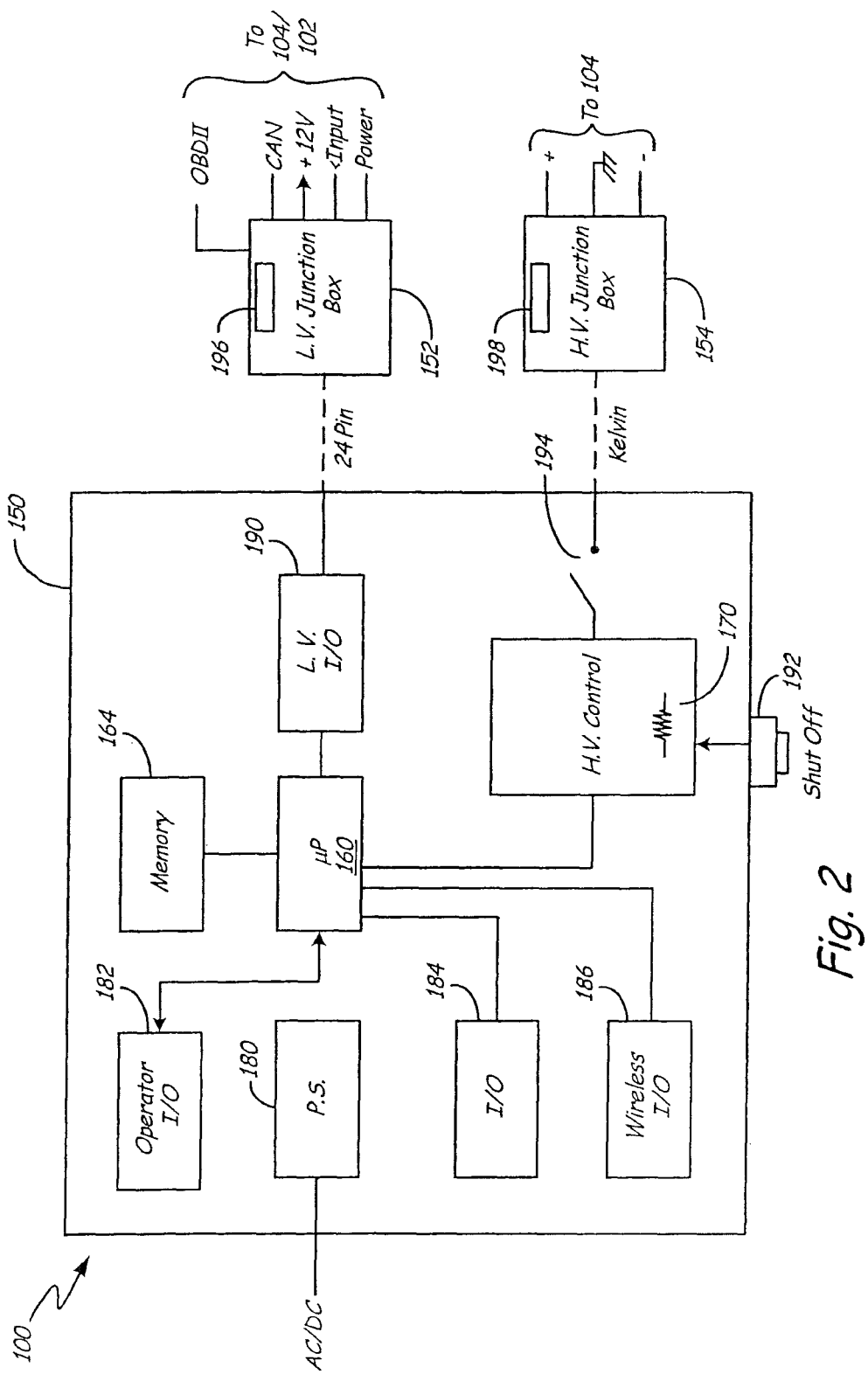
FIG. 2 is a more detailed block diagram of the battery maintenance device of FIG. 1.

FIG. 2 is a simplified block diagram of a battery pack maintenance device 100 in accordance with one example embodiment of the present invention. The device includes microprocessor 160 which operates in accordance with instructions stored in a memory 164. A power supply is used to provide power to the device. The power supply 180 can be coupled to an AC power source, such as a wall outlet or other high power source, for use in charging the battery pack 104 of the vehicle 102. Additionally, the power supply 180 can be coupled to a DC power source, such as a 12 Volt battery, if the device 100 is only used for discharging of the vehicle battery pack 104. For example, in addition to the battery pack 104, many electric vehicles also include a standard 12 Volt automotive battery. This 12 Volt automotive battery can be used to power maintenance device 100. The microprocessor communicates with an operator using an operator input/output 182. Other input/output circuitry 184 is provided for use in physically connecting to a data communication link such as an RS232, USB connection, Ethernet, etc. An optional wireless I/O circuit 186 is also provided for use in communicating in accordance with wireless technologies such as WiFi techniques, Bluetooth®, Zigbee®, etc. Low voltage input/output circuitry 190 is provided for use in communicating with the databus of the vehicle 108, the databus of the battery pack 104, or receiving other inputs or providing outputs to the vehicle 102. Examples include the CAN communication protocol, OBDII, etc. Additionally, contact closures or other voltage inputs or outputs can be applied to the vehicle using the low voltage I/O circuitry 190. FIG. 2 also illustrates an operator shut off switch 192 which can be activated to immediately disconnect the high voltage control 170 from the battery 104 using disconnect switch 194. Other circuit configurations can be used to implement this shut off capability. This configuration allows an operator to perform an emergency shut off or otherwise immediately disconnect the device 100 from the battery if desired.

The low voltage junction box 152 also provides an optional power output. This power can be used, for example, to power components of the vehicle 102 if the vehicle 102 has lost power. This can be useful, for example, to provide power to the controller 108 of the vehicle 102 such that information may be gathered from the vehicle and various components of the vehicle can be controlled such as the contactors 130.

In one configuration, the connection between the high voltage control circuitry 170 and the high voltage junction box 154 is through Kelvin type connectors. This can be used to eliminate the voltage drop which occurs when large currents are drawn through wiring thereby provide more accurate voltage measurements. The actual connection between the junction box 154 and the battery pack 104 need not be through a Kelvin connection if the distance between the junction box 154 and the battery pack 104 is sufficiently short for the voltage drop across the connection leads to be negligible. Isolation circuitry such as fuses may be provided in the junction box 154 to prevent the application of a high voltage or current to the maintenance device 100 and thereby protect circuitry in the device. Similarly, the low voltage junction box 152 and/or the low voltage I/O 190 may include isolation circuitry such as optical isolators, inductors to provide inductive coupling, or other techniques. The low voltage junction box 152 may also include an optional user output and/or input 196. For example, this may be a display which can be observed by an operator. An example display includes an LED display, or individual LEDs, which provides an indication to the operator regarding the functioning of the low voltage junction box, the vehicle, or the battery pack. This can be used to visually inform an operator regarding the various functions being performed by the low voltage junction box, voltages detected by the low voltage junction box. A visual output and/or input 198 can be provided on the high voltage junction box 154.

The appropriate high voltage junction box 154 and low voltage junction box 152 can be selected based upon the particular vehicle 102 or battery pack 104 being inspected. Similarly, the junction boxes 152, 154 can be selected based upon the types of connections which are available in a particular situation. For example, if the vehicle his damaged, it may be impossible to couple to the battery pack 104 through available connectors. Instead, a junction box 154 can be employed which includes connection probes which can be coupled directly to the battery pack 104. Further still, if such a connection is not available or is damaged, connectors can be provided for coupling to individual cells or batteries within the battery pack 104.

The use of the low voltage and high voltage junction boxes 152, 154 are advantageous for a number of reasons. The junction boxes can be used to provide a standardized connection to the circuitry of the maintenance device 100. From a junction box 152, 154, specialized connectors can be provided for use with different types of vehicles and/or battery packs. Similarly, different types of junction boxes 152, 154 can be utilized for different vehicles and/or battery packs. The junction boxes 152, 154 allow a single set cable connection to extend between the device 100 and a remote location. This provides better cable management, case of use, and increased accuracy.

In addition to use as a load for discharging the battery, the high voltage control circuitry may also optionally include a charging for use in charging the battery.

Figure 3:
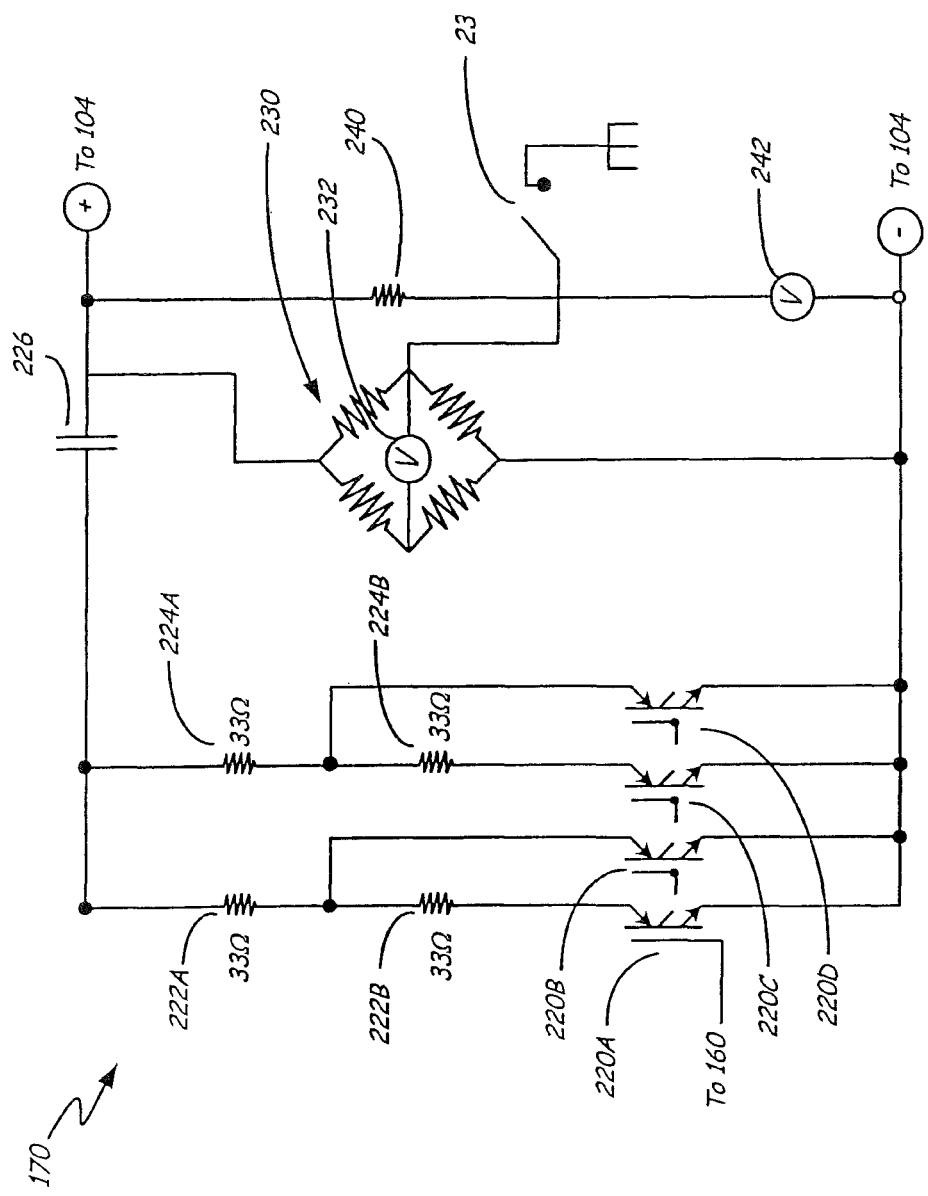
FIG. 3 is an electrical schematic diagram of a controllable load for use in the battery maintenance device of FIG. 2.

FIG. 3 is a schematic diagram of controllable load 170. In FIG. 3, a number of isolated gate bipolar transistors (IGBT) 220A, 220B, 220C, and 220D are shown and controlled by a gate connection to microprocessor 160. The IGBTs 220A-D connect to load resistors 222A, 222B, 224A, and 224B. As illustrated in FIG. 3, the four load resistors are 33 OHM resistors. Using the transistors 220A-D, the resistors 222A, B and 224A, B can be coupled in various series-parallel configurations in order to apply different loads to the battery pack 104. In this way, the load applied to the battery pack 104 is controllable by microprocessor 160. In one aspect, the present invention includes isolated gate bipolar transistors (IGBT) to selectively couple loads to the battery pack 104 for discharging the pack. An IGBT is a transistor configured with four semiconducting layers arranged as PNPN. A metal oxide semiconductor is arranged to provide a gate. The configuration provides a transistor which is controlled easily in a manner similar to a field effect transistor but which is also capable of switching large currents like a bipolar transistor.

When the device 100 is coupled to a vehicle 102 which has been in an accident, the device can perform various tests on the vehicle 102 to determine the condition of the vehicle and the battery. For example, in one aspect, the device 100 detects a leakage between the positive and negative terminals of the battery pack 102 and the ground or chassis of the vehicle 102. For example, a wheat stone bridge circuit 230 can be used between the positive and negative terminals of the battery pack 104 with one of the legs of the bridge connected to ground.

During discharging of the vehicle battery pack 104, data can be collected from the battery pack. For example, battery packs typically include sensors 122 such as voltage, current and temperature sensors arranged to collect data from various locations within the battery pack. This information can be obtained by the maintenance device 100 via the coupling to the databus 110. During discharge, any abnormal parameters measured by the sensors can be used to control the discharge. For example, if the battery pack 104 is experiencing excessive heating, the discharge rate can be reduced until the battery temperature returns to an acceptable level. If any of the internal temperature sensors of the battery pack are not functioning, an external battery pack temperature sensor can be used to detect the temperature of the battery pack. Similarly, if cells within the pack are experiencing an abnormally high current discharge, the discharge rate can be reduced. Further still, if such data cannot be obtained because the sensors are damages or the databus is damaged or inaccessible, the maintenance device 100 can automatically enter a slow/safe discharge state to ensure that the battery is not damaged.

When placing a battery pack 104 into service, the maintenance device 100 can identify individual cells or batteries within the pack 104 which are more or less charged than other cells. Thus, the individual cells or batteries within a pack can be balanced whereby they all have substantially the same charge capacity and/or state of charge as the other cells or batteries within the pack.

In another aspect of the present invention, the maintenance device 100 is capable of providing a "jump start" to a hybrid electric vehicle 102. For example, if the internal combustion engine of a hybrid electric vehicle is started using power directly from the battery pack and if the charge of the battery pack 104 is too low, there is insufficient energy available to start the engine. The maintenance device 100 of the present invention can be used to provide sufficient power to a starter motor of the internal combustion engine for starting the engine. Once the internal combustion engine is running, the engine itself is used to charge the battery pack 104.

In FIG. 3, a voltage sensor 232 is connected across the wheat stone bridge 230. Further, the bridge is optionally connected to electrical ground through switch 234. Any voltage detected by voltage sensor 232 across the bridge 230 is an indication that there is a current leak between the positive and/or negative terminals of the battery pack 104 and the electrical ground or chassis of the vehicle 102. The voltage sensor 232 can provide an output to microprocessor 130 and used to alert an operator of a potentially dangerous situation and indicate that the battery pack 104 must be disconnected from the vehicle 102 before further maintenance is performed.

FIG. 3 also illustrates a relay 226 which is used to isolate the load resistances 222/224 from the battery pack until a discharge is commanded by the microprocessor 160. The voltage across the battery pack 104 can be measured using a voltage sensor 242 connected in series with a resistance 240. The output from sensor 242 is provided to microprocessor 160 for use in performing maintenance in the battery pack 104.

Figure 4:
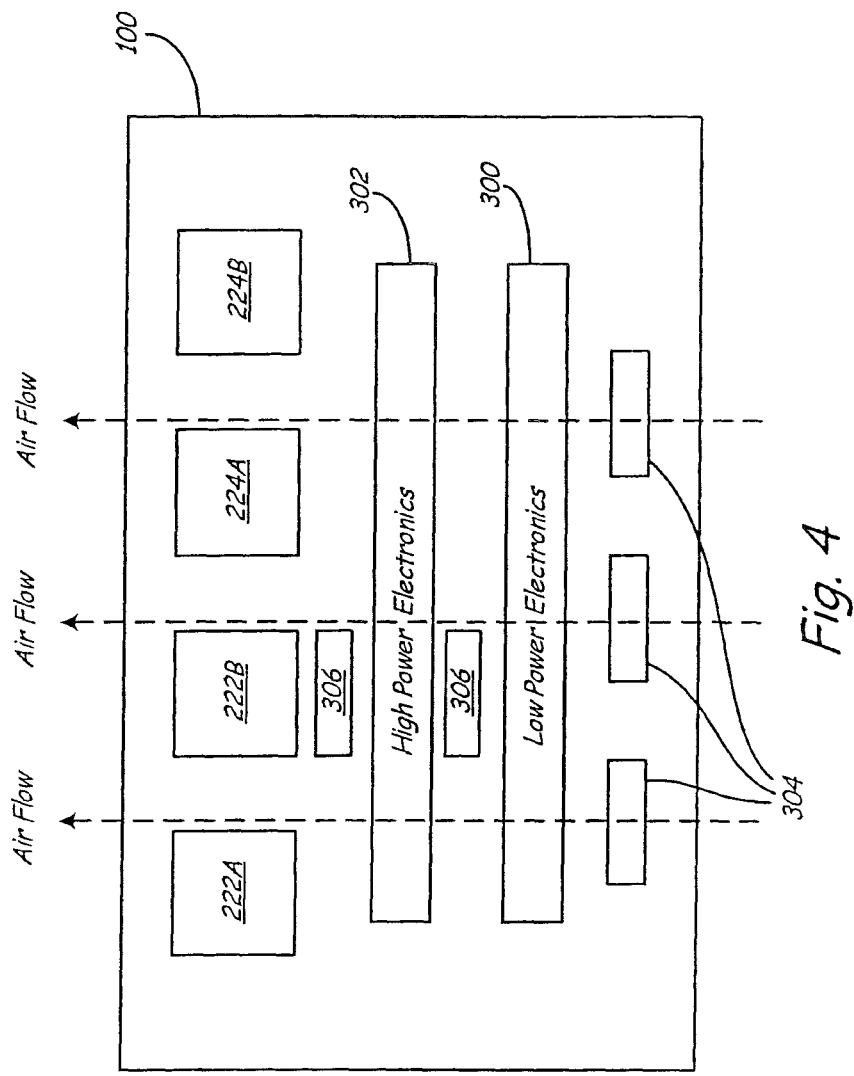
FIG. 4 is a diagram which illustrates one example arrangement of components within the battery maintenance device to promote cooling of such components.

During operation, the components of the device 100 may experience a great deal of heating. An air flow cooling system can be used to dissipate the heat. FIG. 4 shows one such configuration. As illustrated in FIG. 4, the air flow moves from the low power electronics 300, passed the high power electronics 302 and over the load resistors 222A, B and 224A, B. The air flow then leaves the housing of the device 100. In FIG. 4, the air flow is controlled by fans 304. The fans 304 can be controlled using microprocessor 160 whereby their speed can be adjusted as needed based upon measurements from temperature sensors 306 which can be placed at various locations within the housing of device 100. In this configuration, hot air generated by the load resistance is immediately blown out of the housing rather than past any components.

Some electrical vehicles include what is referred to as a "pre-charge contactor." The pre-charge contactor can be used to charge capacitances of the vehicle at a slow and controlled rate prior to switching in the main contactor 130 shown in FIG. 1. This prevents excessive current discharge from the battery pack when the main contactor is activated and the pack is directly coupled to the loads of the vehicle including the traction module of the vehicle which is used to control electric motors of the vehicle.

In another aspect, some or all of the information obtained during testing and discharge of a battery pack 104 is retrieved and stored, for example in the memory 164 shown in FIG. 1, for subsequent access. This information can be offloaded to another device, for example a USB drive or the like, or transmitted over a network connection. This can be particularly useful to examine information retrieved after a vehicle has experienced an accident. The information can be information which is downloaded from the controller 108 of the vehicle 102 and may also be information related to how the vehicle battery pack 104 was discharged and removed of service.

In another aspect, more than one maintenance device 100 can be coupled to a battery pack 104 and the multiple devices can be configured to work in tandem. More specifically, the devices 100 can be coupled using the input/output circuitry 184 shown in FIG. 2 whereby one of the devices 100 operates as a master and one or more other devices 100 operate as slaves under the control of the master device. This arrangement can be used to increase the rate at which a battery pack 104 is discharged. In such a configuration, a bridgeable power supply may also be employed.

Figure 5:
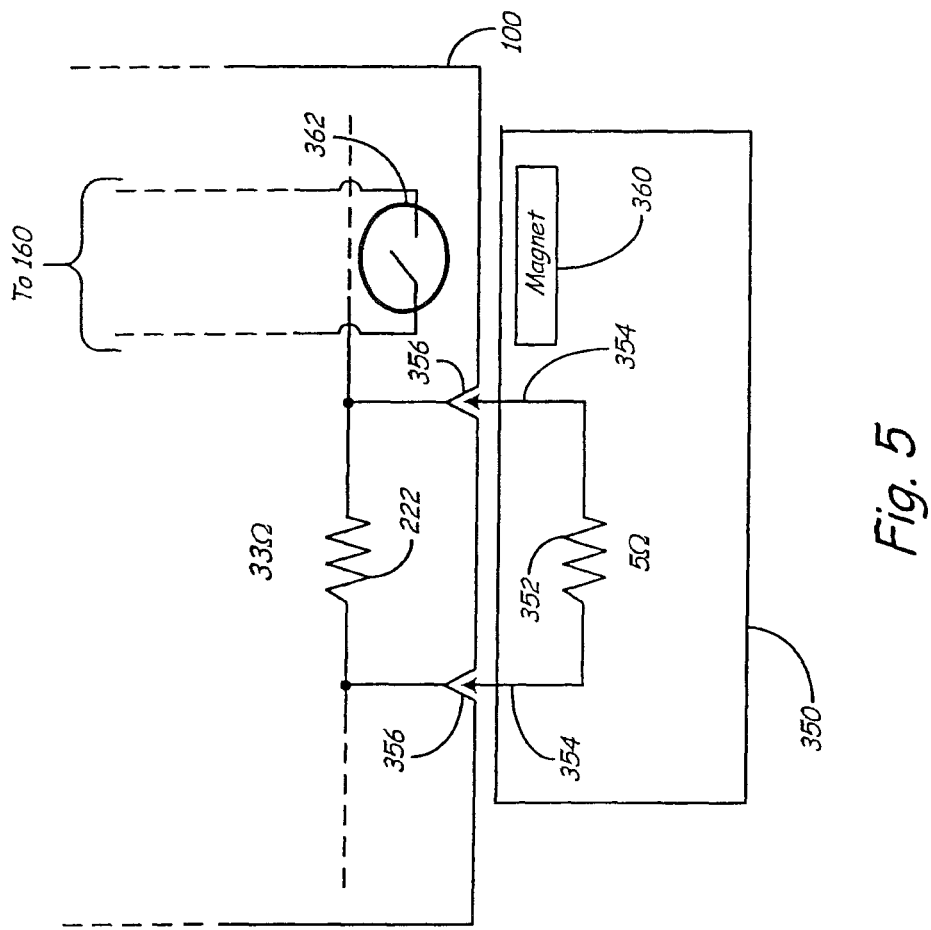
FIG. 5 is a diagram of a plug having an additional load resistance.

FIG. 5 is a simplified diagram showing a removable plug 350 which can be selectively coupled to battery pack maintenance device 100. Removable plug 350 includes a 5 OHM resistor 352 configured to connect in parallel through connectors 354 and 356. Removable plug 350 includes a magnet 360 configured to actuate a reed switch 362. Reed switch 362 connects to microprocessor 160 whereby microprocessor 160 can sense the presence of the plug 350. When plug 350 is coupled to device 100, the resistance of one or more of the 33 OHM resistors 222A,B and 224 A,B can be changed because the resistor is in series with the 5 OHM resistor yielding a resistance of about 4.3 OHMs. However, any configuration desired can be provided. This allows the device 100 to apply a smaller resistance to the battery pack 104 thereby increasing the discharge rate if desired. For example, a particular battery pack may be of a sufficiently low voltage to allow for an increased current draw to thereby increase the rate at which the battery pack 104 is discharged. Using reed switch 362, the microprocessor 160 is able to detect the presence of the plug 350 whereby calculations which rely on the value of applied load resistance can be compensated appropriately. Although only a single resistor 352 is shown, the plug 350 may include any number of resistors to be placed in parallel with load resistances in the device 100. Preferably plug 350 includes a cooling mechanism to reduce the heating of resistor 352. For example, the plug 350 may include metal or other heat conducting fins or the like. A fan may also be employed. The fan may be the same cooling fan used in device 100 or, plug 350 may optionally include its own fan. In another embodiment, the alternative resistance values are located within the main unit, and are switched into circuit using the removable plug.

Figure 6:
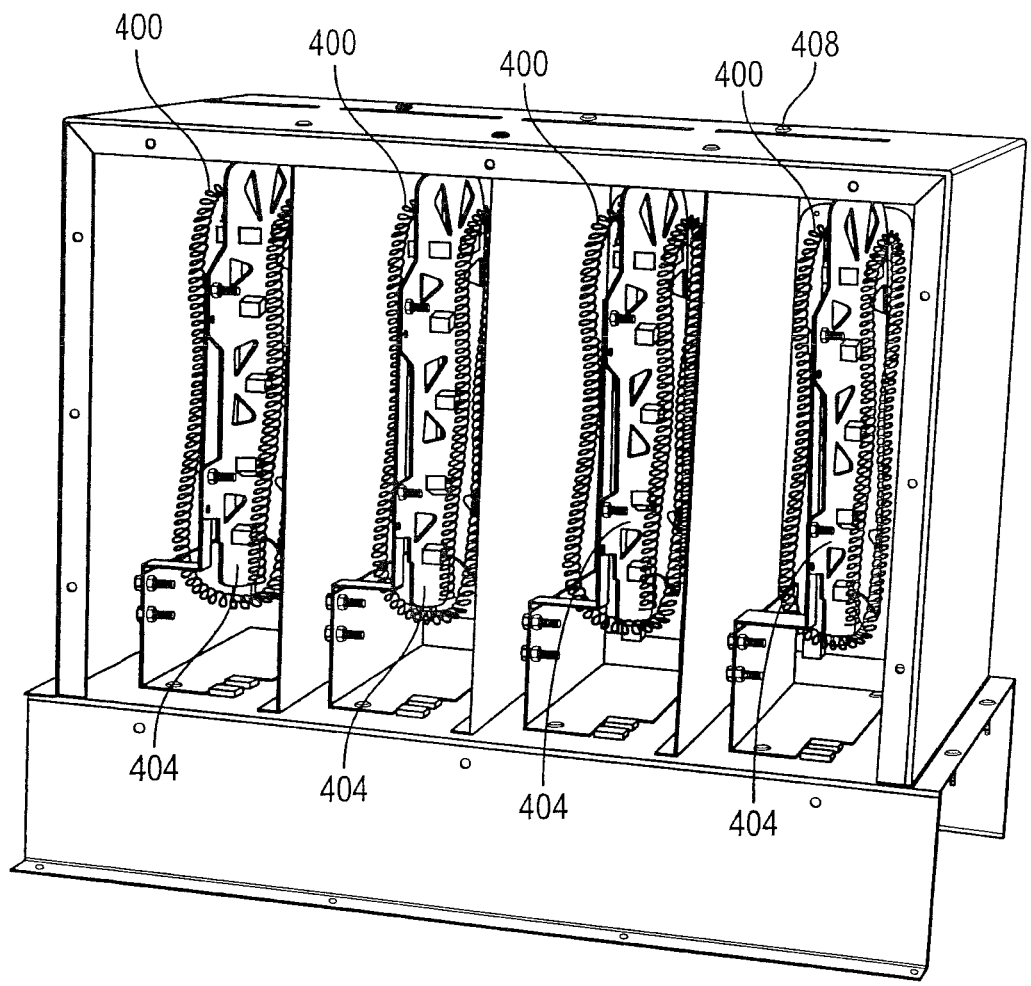
FIG. 6 is a perspective view of a housing having resistive loading coils in accordance with one embodiment.

FIG. 6 is a perspective view of another example embodiment of a controllable load 170 illustrated in a housing 402. In the configuration of FIG. 6, resistive elements are provided using a number of resistive coils 400. In one example embodiment, these resistive coils can be the type of coils used in consumer applications such as electric clothing dryers. For example, one such coil is rated at approximately 5.3 KW at 240 volts. Note that if the rated voltage is exceeded, the coil will melt and become an open circuit. Further, it is also preferable that the coils 400 have resistances which are similar. The coils 400 are carried on supports 404 preferably made of an electric insulator capable of handling high temperatures. To assist in heat dissipation, an air flow can be provided across the coils 400 as shown in FIG. 4.

Figure 7:
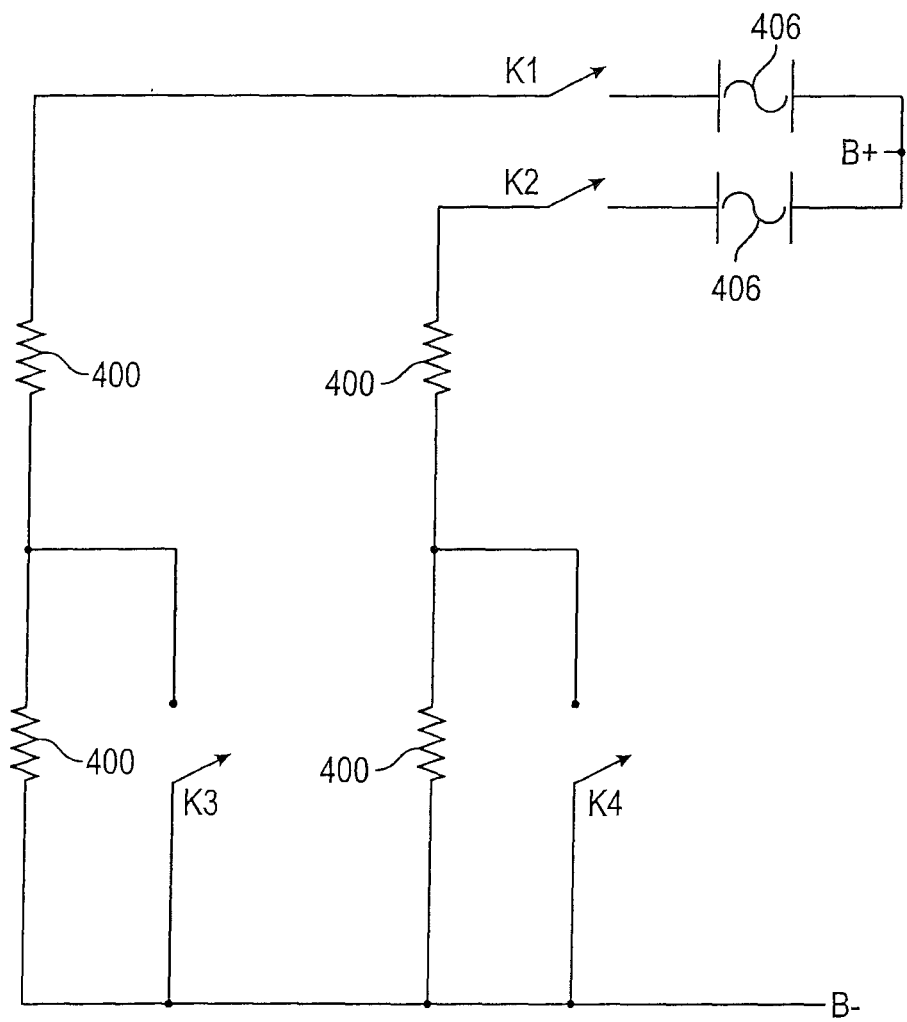
FIG. 7 is a schematic diagram of a controllable resistance load.
Figure 8:
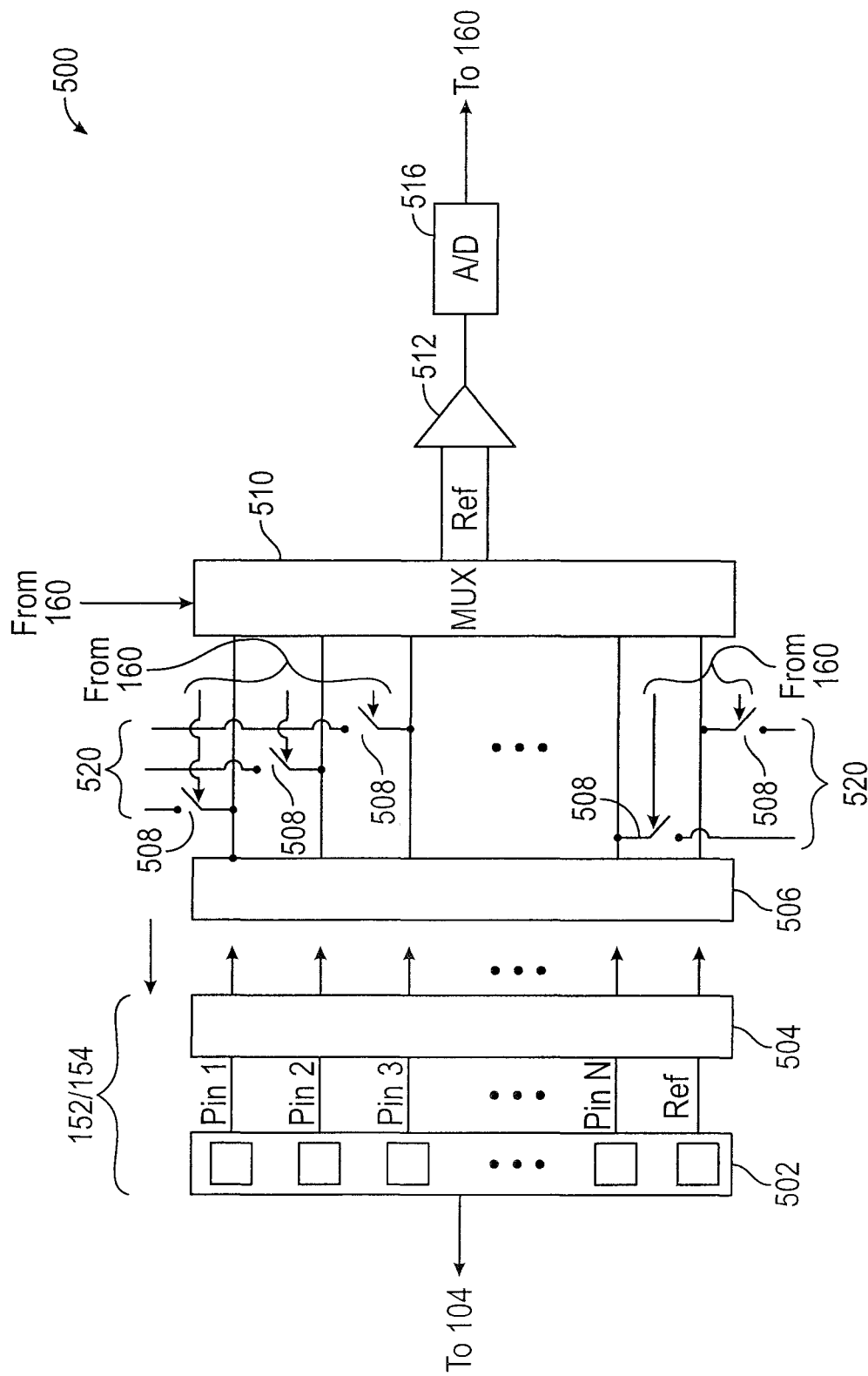
FIG. 8 is a simplified block diagram of an intelligent interface module in accordance with one aspect of the present invention.

FIG. 7 is a simplified schematic diagram of another example embodiment of controllable load 100. In the configuration of FIG. 7, the four coils 400 illustrated in FIG. 6 are electrically connected in a series/parallel configuration. In this configuration, switches K1, K2, K3 and K4 are provided for controlling the resistance provided by controllable load 100. These switches can be any type of switch including relays or transistor switches. In one configuration, the switches are manual switches. Switches K1 and K2 control two parallel legs of the circuit while switches K3 and K4 control the amount of resistance in series in each leg. In this configuration, a maximum discharge capability of 20 KW is provided if both switches K1 and K2 are closed and switches K3 and K4 are open. The B+ and B− connections are used for coupling to the storage battery and fusible links 406 are provided for safety. In one example configuration, if the voltage across terminals B+ and B− drops below 240 volts DC, switch K3 and/or switch K4 can then be closed to reduce the resistance applied to battery 104 and optimize the loading of the battery. FIG. 8 is a graph showing the loading performance of such an arrangement. As illustrated in FIG. 8, the step change occurs when the resistive load provided by controllable load 100 is decreased, for example, by activating switch K2

As mentioned above, the fans illustrated in FIG. 4 can be used to provide an air flow across the coils 400. In one configuration, all of the fans control circuits and relays may be operated by 12 volt DC and can be powered, for example, by an auxiliary battery or a "cigarette lighter" output from a vehicle such as a tow truck. A double insulation technique can be used proximate the load coils such that any electrical fault, for example a heater coil failure, cannot be conducted to a location outside of the housing 402. Optional temperature safety sensors 306 shown in FIG. 4 can be used. The temperature sensors 306 can be provided on both the inlet and the outlet of each heater coil and can be used to detect fan failure or blocked air flow. This configuration can also be used to detect the amount that the air is heated by the coil. In another example configuration, fusible links 404 may provide hard wired temperature cutout switches to prevent overheating. In such a configuration, when a temperature threshold is reached, the switch will open. Data obtained during discharge can be logged to a memory such as memory 164 such as a local flash drive or other local storage device. In another configuration, the logged data is sent to a remote location such as cloud storage for analysis. Such records can be of significance for warranty or insurance purposes.

In one configuration, the voltage sensor 232 is used to detect leakage currents in the battery undergoing discharge. The device can also monitor battery cell voltages and temperatures to ensure that unsafe conditions are not being created during discharge.

The input/output circuitry 190 can be used to connect to a databus of the vehicle, for example, through an OBDII connection in order to collect information such as VIN, software and hardware version numbers, etc. The device can communicate with the battery ECU (Electronic Control Unit) using any appropriate protocol including CAN, LIN, or others, in order to obtain specific battery information and discharge protocols. The device can be connected as a slave unit to another piece of shop equipment either using a hardwire connection or a wireless connection such as Bluetooth or Wi-Fi. Reverse polarity protection as well as overvoltage protection can be provided. Other safety techniques for electrical potential, temperature and axis points can be fully interlocked to prevent operation of the unit. In one configuration, the input/output 184 can include a barcode scanner which can then be used to capture specific information such as battery type or serial number as well as vehicle identification number, etc. In another example configuration, input/output circuitry 184 can include a remote temperature sensor that can be electrically coupled to the discharger to report battery temperature. This is useful when internal battery temperature sensors are damaged or inoperative. The devices are scalable such that multiple controllable loads 100 can be connected in parallel. Relay contacts can also be provided and available externally to control various circuits on the battery pack undergoing discharge. Additional voltage sensing connections such as those provided by junction box 152 can be used to monitor various circuits on the battery pack.

Another example configuration includes a high voltage DC to DC converter such as power supply 180 shown in FIG. 2. In such a configuration, the high voltage output from the battery pack can be converted to a lower DC voltage for use in powering the device.

As discussed above, in some configurations the present invention can be arranged to measure a dynamic parameter of the battery pack. In such a configuration, a forcing function is applied to the battery pack and a dynamic parameter such as dynamic conductance, resistance, admittance, etc. can be determined based upon a change in the voltage across the battery pack and the current flowing through the battery pack. The forcing function can be any type of function which has a time varying aspect including an AC signal or a transient signal.

In one aspect, the maintenance device can be configured to "balance" individual cells within the battery pack. The balancing can be performed by selected cells or individual batteries within the pack which have similar storage capacity and state of charge. The charging feature of the device can be used to increase the charge of a cell or battery to that of other cells or batteries. Similarly, the maintenance device can be used to discharge individual cells or batteries to a level similar to that of other cells or batteries within the pack.

When servicing the modules, the internal pack connections are removed, and alternate cabling is supplied from the service/battery maintenance tool. A common application in a service tool is to employ the industry standard interface ICs to monitor the voltage and temperatures and/or apply charging voltages/currents to the battery module.

The problem which exists in the service environment, is that the polarity and voltages on individual pins cannot easily be protected by cable design. For example, the interface connector that mates with one type of battery module, frequently also mates with an alternate battery module that has opposite polarity on the pins, or alternate cell numbering on the pins. Therefore, the absolute maximum limits of the IC can easily be violated by simply plugging in the wrong connector, damaging the circuit, and rendering inoperable the service/battery maintenance tool.

The present invention includes an Intelligent Interface Module that can be connected to any cell configuration, in any polarity, without damage and with full functionality.

In one preferred embodiment, 24 cell voltages will be measured, although the invention can be extended to any number of cell voltages.

The embodiment connects 25 wires to the interface. 24 of these connect to cells and one to electrical ground. Each wire can be connected to any cell node. Any number of cells from 1 to 24 can be connected.

The embodiment measures all 25 wire voltages compared to an internally produced reference voltage. All of the voltages present on the wires can then be measured, and sorted. Once sorted, the deltas of adjacent cells is computed.

The output of the embodiment is then a "virtual" cell ordering can be presented to the service tool. Additional, information can be presented related to which cell node is located on which wire of the connector.

TABLE 1

| Physical Pin # | Measured Voltage | Virtual Pin # | Virtual Voltage | | Physical Pin # |
|---|---|---|---|---|---|
| 1 | 0.000 | 1 | 0.000 | Measured on Pin | 21 |
| 2 | −7.784 | 2 | 3.892 | Measured on Pin | 14 |

TABLE 1-continued

| Physical Pin # | Measured Voltage | Virtual Pin # | Virtual Voltage | | Physical Pin # |
|---|---|---|---|---|---|
| 3 | −66.164 | 3 | 7.784 | Measured on Pin | 6 |
| 4 | −15.568 | 4 | 11.676 | Measured on Pin | 3 |
| 5 | −42.812 | 5 | 15.568 | Measured on Pin | 22 |
| 6 | −70.056 | 6 | 19.460 | Measured on Pin | 25 |
| 7 | −19.460 | 7 | 23.352 | Measured on Pin | 18 |
| 8 | −23.352 | 8 | 27.244 | Measured on Pin | 16 |
| 9 | −35.028 | 9 | 31.136 | Measured on Pin | 10 |
| 10 | −46.704 | 10 | 35.028 | Measured on Pin | 5 |
| 11 | −27.244 | 11 | 38.920 | Measured on Pin | 23 |
| 12 | 7.784 | 12 | 42.812 | Measured on Pin | 9 |
| 13 | 15.568 | 13 | 46.704 | Measured on Pin | 15 |
| 14 | −73.948 | 14 | 50.596 | Measured on Pin | 11 |
| 15 | −31.136 | 15 | 54.488 | Measured on Pin | 8 |
| 16 | −50.596 | 16 | 58.380 | Measured on Pin | 7 |
| 17 | −11.676 | 17 | 62.272 | Measured on Pin | 4 |
| 18 | −54.488 | 18 | 66.164 | Measured on Pin | 17 |
| 19 | −3.892 | 19 | 70.056 | Measured on Pin | 2 |
| 20 | 3.892 | 20 | 73.948 | Measured on Pin | 19 |
| 21 | −77.840 | 21 | 77.840 | Measured on Pin | 1 |
| 22 | −62.272 | 22 | 81.732 | Measured on Pin | 20 |
| 23 | −38.920 | 23 | 85.624 | Measured on Pin | 12 |
| 24 | 11.676 | 24 | 89.516 | Measured on Pin | 24 |
| 25 | −58.380 | 25 | 93.408 | Measured on Pin | 13 |

Table 1 is an illustration of virtual pin mapping in accordance with one example embodiment of the above mentioned invention. In this configuration, the lowest voltage measured is assumed to be connected to pin 1. However, other configurations can also be employed. By comparing relative voltages between the various pins, as illustrated in the Table, the pin mapping order of the physical pins may be determined.

Once the physical layout of the pin connectors is determined, the maintenance circuitry and techniques discussed herein can be employed. This allows the maintenance device to be employed with different types of battery packs and automatically determine the correct connections in order to service the battery pack.

FIG. 8 is a simplified schematic diagram of an intelligent interface module 500 in accordance with one example configuration. Interface module 500 includes a cable which functions as a junction box 152 or 154 and includes a connector 502 configured to plug into a connector 104 on the battery pack 104. These pins may connect to individual cell or cells within the battery pack 104 or other components within the battery pack 104 such as resistance based temperature sensors used to measure temperature within the battery pack 104. The particular cable 152/154 can be selected based upon the configuration of the particular battery pack 104 under test. This cable 152/154 includes a connector 504 which plugs into a connector 506 of the main unit 150.

In addition to determining the "virtual pin" configuration of the battery 104, it is also important to determine which of the connectors to the battery pack 104 connect to individual cells within the pack and which of those connectors (or "pins") connect to temperature sensors. As illustrated in FIG. 8, module 500 includes a multiplexer 510 configured to electrically couple to each of the pins presented by the battery pack 104. Although a single multiplexer 510 is shown, any number of multiplexers may be employed. Additionally, a configuration which employs no multiplexers can also be implemented. The multiplexer 510 operates under the control microprocessor 160 and selectively couples individual pins from the battery pack 104 to an amplifier 512. The amplifier 512 also connects to a reference connection which may, for example, be a ground or a pin out provided by the battery pack 104, or simply an arbitrary pin out connection from the pack 104. The outputs from the amplifier 512 is provided to an analog to digital converter 516 which provides a digitized output to microprocessor 160.

The microprocessor 160 can use the multiplexer 510 to obtain voltage measurements using the amplifier 512 and analog to digital converter 516 by selectively connecting to each of the pins presented by the battery pack 104. Using these voltage measurements, the microprocessor can determine the virtual pin out connection of the battery pack 104 as presented by the cable 152/154.

One problem that can occur during operation is that a technician can select an incorrect cable used to test the individual batteries within the pack 104. If only voltages are being measured, this may result in error in the measurements. However, if the main unit 150 expects that certain pins connect to temperature sensors, the device may be damaged if a pin output from pack 104 which carries a battery voltage is coupled to temperature sensing circuitry. Thus, the microprocessor 160 is able to determine which of the pins are not energized and thereby determine that the particular pin can be coupled to temperature measurement circuitry without damage. Further, the various measured voltages, including the pins that have no voltage, can be used by the microprocessor 160 to ensure that the proper cable 152/154 is being used to connect to the battery pack 104. If the pin out does not match the expected configuration, the microprocessor can provide an output to an operator using for example operator I/O 182 to indicate that an error has occurred. The expected cable can be provided as an output to the operator in order to correct the error. This could also be an indication that the operator has misidentified the type of battery pack being tested. In one aspect, a memory 590 is provided in the cable which carries information used to identify the cable and what type of battery pack 104 the cable is configured to connect to.

Figure 9:
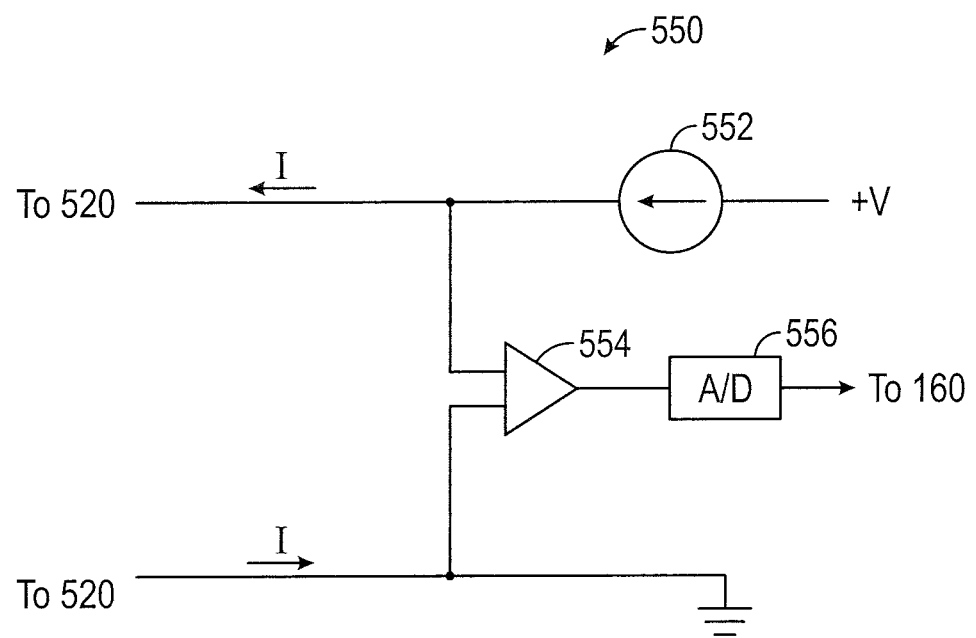
FIG. 9 is a simplified schematic diagram showing temperature measurement circuitry.

As shown in FIG. 8, connection headers 520 are used to provide an electric connection from the individual pins to temperature measurement circuitry 550 shown in FIG. 9. Temperature measurement circuitry 550 includes a current source 552 which injects a current I into a resistance based temperature sensor in the battery pack 104. The resistance of the temperature sensor changes based upon temperature and thus the resultant voltage drop across its pin connection changes. An amplifier 554 is arranged to measure this voltage drop and provides an output to an analog to digital converter 556. The digitized output indicative of battery temperature is then provided to microprocessor 160.

As illustrated in FIG. 8, the connection between headers 520 and the individual pins are controlled by switches 508 which operate under the control of microprocessor 160. Microprocessor 160 only engages those switches which are known to provide an electrical connection to a temperature sensor thereby preventing a voltage from being applied to the temperature measurement circuitry 550 illustrated in FIG. 9. The temperature information can be used to detect a failure or impending failure in the battery pack 104 including a thermal run-away condition.

An optional temperature sensor 594 can also be provided in the cable 152/154 or main unit. The sensor 594 can be an infrared temperature sensor, or a sensor which requires a physical coupling. The sensor can be positioned adjacent the battery pack 104 to detect excessive temperatures which may indicate a failure or impending failure in the pack 104. For example, a cell with a high resistance may cause heating to occur. The information from the internal or external temperature sensors can be used to control the charging of the pack 104 and provided as a diagnostic output, for example, to an operator.

In another aspect, the device of FIG. 1 includes an ambient temperature sensor. The microprocessor can use information from the ambient temperature sensor in determining how the battery pack should be discharged. For example, if the ambient temperature is high, the discharge rate can be reduced. In another example, if the ambient temperature deviates from a nominal value, say 25° C.', the discharge rate can be adjusted accordingly. More specifically, the discharge rate can be reduced for certain battery packs during cold temperatures.

During discharge of the battery pack, the discharge profile can be monitored to ensure proper operation. For example, if the voltage of the battery suddenly drops, this can be an indication that a component within the battery has failed or a short circuit has occurred.

Different types of junction boxes and connection cables can be used based upon the particular type of vehicle and battery pack under maintenance. The microprocessor can provide information to the operator prompting the operator to use the appropriate junction box or cable. This can be based upon the operator inputting the vehicle identification number (VIN) to the microprocessor, or other identifying information including an identification number associated with the battery pack. During discharging of the battery pack, the microprocessor can also provide information to the operator which indicates the time remaining to complete the discharge. The microprocessor 160 can also detect if the correct junction box and cable have been coupled to the device and to the battery pack for the particular battery pack and vehicle under maintenance. Information can be provided to the operator if the wrong cabling or junction box has been employed.

The device of the present invention can be used with battery packs which have been removed from a vehicle as well as individual batteries, or groups of batteries, within a pack. For example, a battery pack typically includes a battery connector assembly which is used by the vehicle 102 to couple to the battery pack 104. However, when the battery pack 104 is removed from the vehicle 102, the device 100 can directly couple to this battery connector assembly and thereby charge or discharge the battery pack, perform tests on the battery pack, interact with devices on the battery pack including sensors, controllers, etc. As discussed above, the device 100 can include multiple connectors for use in connecting the low voltage junction box 152 and/or the high voltage junction box 154 to the vehicle 102 and/or battery pack 104. This allows the device 100 to easily be modified to interact with different types of batteries or vehicles by simply selecting the appropriate connector. In one configuration, the connectors include some type of identifier which can be read by the device 100 whereby the microprocessor 160 and device 100 can receive information to thereby identify the type of connector in use. This allows the microprocessor 100 to know what types of information or tests may be available through the various connectors. In another example, the operator uses operator I/O 182 shown in FIG. 2 to input information to the microprocessor 160 related to the type of connector(s) being used. In another example embodiment, the microprocessor 160 may receive information which identifies the type of vehicle or battery on which maintenance is being performed. This information can be input by an operator using the operator I/O 182, or through some other means such as by communicating with the databus of the vehicle, scanning a barcode or other type of input, etc. Based upon this information, the microprocessor can provide an output to the operator using operator I/O 182 which informs the operator which type of interconnect cable should be used to couple the low voltage junction box 152 and/or the high voltage junction box 154 to the vehicle and/or battery pack.

The operator I/O 182 may include a display along with a keypad input or touchscreen. The input may take various formats, for example, a menu driven format in which an operator moves through a series of menus selecting various options and configurations. Similarly, the operator I/O 182 can be used by the microprocessor 160 to step the operator through a maintenance procedure. In one configuration, the memory 164 is configured to receive a user identification which identifies the operator using the equipment. This can be input, for example, through operator I/O 182 and allows information related to the maintenance being performed to be associated with information which identifies a particular operator. Additional information that can be associated with the maintenance data include tests performed on the vehicle and/or battery, logging information, steps performed in accordance with the maintenance, date and time information, geographical location information, environmental information including temperature, test conditions, etc., along with any other desired information. This information can be stored in memory 164 for concurrent or subsequent transmission to another device or location for further analysis. Memory 164 can also store program instructions, battery parameters, vehicle parameters, testing or maintenance information or procedures, as well as other information. These programming instructions can be updated, for example, using I/O 184 or 186, through an USB flash drive, SD card or other memory device, or through some other means as desired. This allows the device 100 to be modified, for example, if new types of vehicles or battery pack configurations are released, if new testing or maintenance procedures are desired, etc.

Although the present invention has been described with reference to preferred embodiments, workers skilled in the art will recognize that changes may be made in form and detail without departing from the spirit and scope of the invention. Techniques useful for implementing the invention can be found in U.S. Pat. No. 3,873,911, issued Mar. 25, 1975, to Champlin; U.S. Pat. No. 3,873,911, issued Mar. 25, 1975, to Champlin; U.S. Pat. No. 3,909,708, issued Sep. 30, 1975, to Champlin; U.S. Pat. No. 4,816,768, issued Mar. 28, 1989, to Champlin; U.S. Pat. No. 4,825,170, issued Apr. 25, 1989, to Champlin; U.S. Pat. No. 4,881,038, issued Nov. 14, 1989, to Champlin; U.S. Pat. No. 4,912,416, issued Mar. 27, 1990, to Champlin; U.S. Pat. No. 5,140,269, issued Aug. 18, 1992, to Champlin; U.S. Pat. No. 5,343,380, issued Aug. 30, 1994; U.S. Pat. No. 5,572,136, issued Nov. 5, 1996; U.S. Pat. No. 5,574,355, issued Nov. 12, 1996; U.S. Pat. No. 5,583,416, issued Dec. 10, 1996; U.S. Pat. No. 5,585,728, issued Dec. 17, 1996; U.S. Pat. No. 5,589,757, issued Dec. 31, 1996; U.S. Pat. No. 5,592,093, issued Jan. 7, 1997; U.S. Pat. No. 5,598,098, issued Jan. 28, 1997; U.S. Pat. No. 5,656,920, issued Aug. 12, 1997; U.S. Pat. No. 5,757,192, issued May 26, 1998; U.S. Pat. No. 5,821,756, issued Oct. 13, 1998; U.S. Pat. No. 5,831,435, issued Nov. 3, 1998; U.S. Pat. No. 5,871,858, issued Feb. 16, 1999; U.S. Pat. No. 5,914,605, issued Jun. 22, 1999; U.S. Pat. No. 5,945,829, issued Aug. 31, 1999; U.S. Pat. No. 6,002,238, issued Dec. 14, 1999; U.S. Pat. No. 6,037,751, issued Mar. 14, 2000; U.S. Pat. No. 6,037,777, issued Mar. 14, 2000; U.S. Pat. No. 6,051,976, issued Apr. 18, 2000; U.S. Pat. No. 6,081,098, issued Jun. 27, 2000; U.S. Pat. No. 6,091,245, issued Jul. 18, 2000; U.S. Pat. No. 6,104,167, issued Aug. 15, 2000; U.S. Pat. No. 6,137,269, issued Oct. 24, 2000; U.S. Pat. No. 6,163,156, issued Dec. 19, 2000; U.S. Pat. No. 6,172,483, issued Jan. 9, 2001; U.S. Pat. No. 6,172,505, issued Jan. 9, 2001; U.S. Pat. No. 6,222,369, issued Apr. 24, 2001; U.S. Pat. No. 6,225,808, issued May 1, 2001; U.S. Pat. No. 6,249,124, issued Jun. 19, 2001; U.S. Pat. No. 6,259,254, issued Jul. 10, 2001; U.S. Pat. No. 6,262,563, issued Jul. 17, 2001; U.S. Pat. No. 6,294,896, issued Sep. 25, 2001; U.S. Pat. No. 6,294,897, issued Sep. 25, 2001; U.S. Pat. No. 6,304,087, issued Oct. 16, 2001; U.S. Pat. No. 6,310,481, issued Oct. 30, 2001; U.S. Pat. No. 6,313,607, issued Nov. 6, 2001; U.S. Pat. No. 6,313,608, issued Nov. 6, 2001; U.S. Pat. No. 6,316,914, issued Nov. 13, 2001; U.S. Pat. No. 6,323,650, issued Nov. 27, 2001; U.S. Pat. No. 6,329,793, issued Dec. 11, 2001; U.S. Pat. No. 6,331,762, issued Dec. 18, 2001; U.S. Pat. No. 6,332,113, issued Dec. 18, 2001; U.S. Pat. No. 6,351,102, issued Feb. 26, 2002; U.S. Pat. No. 6,359,441, issued Mar. 19, 2002; U.S. Pat. No. 6,363,303, issued Mar. 26, 2002; U.S. Pat. No. 6,377,031, issued Apr. 23, 2002; U.S. Pat. No. 6,392,414, issued May 21, 2002; U.S. Pat. No. 6,417,669, issued Jul. 9, 2002; U.S. Pat. No. 6,424,158, issued Jul. 23, 2002; U.S. Pat. No. 6,441,585, issued Aug. 17, 2002; U.S. Pat. No. 6,437,957, issued Aug. 20, 2002; U.S. Pat. No. 6,445,158, issued Sep. 3, 2002; U.S. Pat. Nos. 6,456,045; 6,466,025, issued Oct. 15, 2002; U.S. Pat. No. 6,465,908, issued Oct. 15, 2002; U.S. Pat. No. 6,466,026, issued Oct. 15, 2002; U.S. Pat. No. 6,469,511, issued Nov. 22, 2002; U.S. Pat. No. 6,495,990, issued Dec. 17, 2002; U.S. Pat. No. 6,497,209, issued Dec. 24, 2002; U.S. Pat. No. 6,507,196, issued Jan. 14, 2003; U.S. Pat. No. 6,534,993; issued Mar. 18, 2003; U.S. Pat. No. 6,544,078, issued Apr. 8, 2003; U.S. Pat. No. 6,556,019, issued Apr. 29, 2003; U.S. Pat. No. 6,566,883, issued May 20, 2003; U.S. Pat. No. 6,586,941, issued Jul. 1, 2003; U.S. Pat. No. 6,597,150, issued Jul. 22, 2003; U.S. Pat. No. 6,621,272, issued Sep. 16, 2003; U.S. Pat. No. 6,623,314, issued Sep. 23, 2003; U.S. Pat. No. 6,633,165, issued Oct. 14, 2003; U.S. Pat. No. 6,635,974, issued Oct. 21, 2003; U.S. Pat. No. 6,696,819, issued Feb. 24, 20144; U.S. Pat. No. 6,707,303, issued Mar. 16, 2004; U.S. Pat. No. 6,737,831, issued May 18, 2004; U.S. Pat. No. 6,744,149, issued Jun. 1, 2004; U.S. Pat. No. 6,759,849, issued Jul. 6, 2004; U.S. Pat. No. 6,781,382, issued Aug. 24, 2004; U.S. Pat. No. 6,788,025, filed Sep. 7, 2004; U.S. Pat. No. 6,795,782, issued Sep. 21, 2004; U.S. Pat. No. 6,805,090, filed Oct. 19, 2004; U.S. Pat. No. 6,806,716, filed Oct. 19, 2004; U.S. Pat. No. 6,850,037, filed Feb. 1, 2005; U.S. Pat. No. 6,850,037, issued Feb. 1, 2005; U.S. Pat. No. 6,871,151, issued Mar. 22, 2005; U.S. Pat. No. 6,885,195, issued Apr. 26, 2005; U.S. Pat. No. 6,888,468, issued May 3, 2005; U.S. Pat. No. 6,891,378, issued May 10, 2005; U.S. Pat. No. 6,906,522, issued Jun. 14, 2005; U.S. Pat. No. 6,906,523, issued Jun. 14, 2005; U.S. Pat. No. 6,909,287, issued Jun. 21, 2005; U.S. Pat. No. 6,914,413, issued Jul. 5, 2005; U.S. Pat. No. 6,913,483, issued Jul. 5, 2005; U.S. Pat. No. 6,930,485, issued Aug. 16, 2005; U.S. Pat. No. 6,933,727, issued Aug. 23, 200; U.S. Pat. No. 6,941,234, filed Sep. 6, 2005; U.S. Pat. No. 6,967,484, issued Nov. 22, 2005; U.S. Pat. No. 6,998,847, issued Feb. 14, 2006; U.S. Pat. No. 7,003,410, issued Feb. 21, 2006; U.S. Pat. No. 7,003,411, issued Feb. 21, 2006; U.S. Pat. No. 7,012,433, issued Mar. 14, 2006; U.S. Pat. No. 7,015,674, issued Mar. 21, 2006; U.S. Pat. No. 7,034,541, issued Apr. 25, 2006; U.S. Pat. No. 7,039,533, issued May 2, 2006; U.S. Pat. No. 7,058,525, issued Jun. 6, 2006; U.S. Pat. No. 7,081,755, issued Jul. 25, 2006; U.S. Pat. No.

7,106,070, issued Sep. 12, 2006; U.S. Pat. No. 7,116,109, issued Oct. 3, 2006; U.S. Pat. No. 7,119,686, issued Oct. 10, 2006; and U.S. Pat. No. 7,126,341, issued Oct. 24, 2006; U.S. Pat. No. 7,154,276, issued Dec. 26, 2006; U.S. Pat. No. 7,198,510, issued Apr. 3, 2007; U.S. Pat. No. 7,363,175, issued Apr. 22, 2008; U.S. Pat. No. 7,208,914, issued Apr. 24, 2007; U.S. Pat. No. 7,246,015, issued Jul. 17, 2007; U.S. Pat. No. 7,295,936, issued Nov. 13, 2007; U.S. Pat. No. 7,319,304, issued Jan. 15, 2008; U.S. Pat. No. 7,363,175, issued Apr. 22, 2008; U.S. Pat. No. 7,398,176, issued Jul. 8, 2008; U.S. Pat. No. 7,408,358, issued Aug. 5, 2008; U.S. Pat. No. 7,425,833, issued Sep. 16, 2008; U.S. Pat. No. 7,446,536, issued Nov. 4, 2008; U.S. Pat. No. 7,479,763, issued Jan. 20, 2009; U.S. Pat. No. 7,498,767, issued Mar. 3, 2009; U.S. Pat. No. 7,501,795, issued Mar. 10, 2009; U.S. Pat. No. 7,505,856, issued Mar. 17, 2009; U.S. Pat. No. 7,545,146, issued Jun. 9, 2009; U.S. Pat. No. 7,557,586, issued Jul. 7, 2009; U.S. Pat. No. 7,595,643, issued Sep. 29, 2009; U.S. Pat. No. 7,598,699, issued Oct. 6, 2009; U.S. Pat. No. 7,598,744, issued Oct. 6, 2009; U.S. Pat. No. 7,598,743, issued Oct. 6, 2009; U.S. Pat. No. 7,619,417, issued Nov. 17, 2009; U.S. Pat. No. 7,642,786, issued Jan. 5, 2010; U.S. Pat. No. 7,642,787, issued Jan. 5, 2010; U.S. Pat. No. 7,656,162, issued Feb. 2, 2010; U.S. Pat. No. 7,688,074, issued Mar. 30, 2010; U.S. Pat. No. 7,705,602, issued Apr. 27, 2010; U.S. Pat. No. 7,706,992, issued Apr. 27, 2010; U.S. Pat. No. 7,710,119, issued May 4, 2010; U.S. Pat. No. 7,723,993, issued May 25, 2010; U.S. Pat. No. 7,728,597, issued Jun. 1, 2010; U.S. Pat. No. 7,772,850, issued Aug. 10, 2010; U.S. Pat. No. 7,774,151, issued Aug. 10, 2010; U.S. Pat. No. 7,777,612, issued Aug. 17, 2010; U.S. Pat. No. 7,791,348, issued Sep. 7, 2010; U.S. Pat. No. 7,808,375, issued Oct. 5, 2010; U.S. Pat. No. 7,924,015, issued Apr. 12, 2011; U.S. Pat. No. 7,940,053, issued May 10, 2011; U.S. Pat. No. 7,940,052, issued May 10, 2011; U.S. Pat. No. 7,959,476, issued Jun. 14, 2011; U.S. Pat. No. 7,977,914, issued Jul. 12, 2011; U.S. Pat. No. 7,999,505, issued Aug. 16, 2011; U.S. Pat. No. D643,759, issued Aug. 23, 2011; U.S. Pat. No. 8,164,343, issued Apr. 24, 2012; U.S. Pat. No. 8,198,900, issued Jun. 12, 2012; U.S. Pat. No. 8,203,345, issued Jun. 19, 2012; U.S. Pat. No. 8,237,448, issued Aug. 7, 2012; U.S. Pat. No. 8,306,690, issued Nov. 6, 2012; U.S. Pat. No. 8,344,685, issued Jan. 1, 2013; U.S. Pat. No. 8,436,619, issued May 7, 2013; U.S. Pat. No. 8,442,877, issued May 14, 2013; U.S. Pat. No. 8,493,022, issued Jul. 23, 2013; U.S. Pat. No. D687,727, issued Aug. 13, 2013; U.S. Pat. No. 8,513,949, issued Aug. 20, 2013; U.S. Pat. No. 8,674,654, issued Mar. 18, 2014; U.S. Pat. No. 8,674,711, issued Mar. 18, 2014; U.S. Pat. No. 8,704,483, issued Apr. 22, 2014; U.S. Pat. No. 8,738,309, issued May 27, 2014; U.S. Pat. No. 8,754,653, issued Jun. 17, 2014; U.S. Pat. No. 8,872,516, issued Oct. 28, 2014; U.S. Pat. No. 8,872,517, issued Oct. 28, 2014; U.S. Pat. No. 8,958,998, issued Feb. 17, 2015; U.S. Pat. No. 8,963,550, issued Feb. 24, 2015; U.S. Pat. No. 9,018,958, issued Apr. 28, 2015; U.S. Pat. No. 9,052,366, issued Jun. 9, 2015; U.S. Pat. No. 9,201,120, issued Dec. 1, 2015; U.S. Pat. No. 9,229,062, issued Jan. 5, 20126; U.S. Pat. No. 9,244,100, issued Jan. 26, 2016; U.S. Pat. No. 9,274,157, issued Mar. 1, 2016; U.S. Pat. No. 9,312,575, issued Apr. 12, 2016; U.S. Pat. No. 9,335,362, issued May 10, 2016; U.S. Pat. No. 9,425,487, issued Aug. 23, 2016; U.S. Pat. No. 9,419,311, issued Aug. 16, 2016; U.S. Pat. No. 9,496,720, issued Nov. 15, 2016; U.S. Pat. No. 9,588,185, issued Mar. 7, 2017; U.S. Pat. No. 9,923,289, issued Mar. 20, 2018; U.S. Pat. No. 9,966,676, issued May 8, 2018; U.S. Pat. No. 10,046,649, issued Aug. 14, 2018; U.S. Pat. No. 10,222,397, issued Mar. 5, 2019; U.S. Pat. No. 10,317,468, issued Jun. 11, 2019; U.S. Pat. No. 10,429,449, issued Oct. 1, 2019; U.S. Pat. No. 10,473,555, issued Nov. 12, 2019; U.S. Pat. No. 10,608,353, issued Mar. 31, 2020; U.S. Pat. No. 10,843,574, issued Nov. 24, 2020; U.S. Ser. No. 09/780, 146, filed Feb. 9, 2001, entitled STORAGE BATTERY WITH INTEGRAL BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/880,473, filed Jun. 13, 2001; entitled BATTERY TEST MODULE; U.S. Ser. No. 10/109, 734, filed Mar. 28, 2002, entitled APPARATUS AND METHOD FOR COUNTERACTING SELF DISCHARGE IN A STORAGE BATTERY; U.S. Ser. No. 10/263,473, filed Oct. 2, 2002, entitled ELECTRONIC BATTERY TESTER WITH RELATIVE TEST OUTPUT; U.S. Ser. No. 09/653, 963, filed Sep. 1, 2000, entitled SYSTEM AND METHOD FOR CONTROLLING POWER GENERATION AND STORAGE; U.S. Ser. No. 10/174,110, filed Jun. 18, 2002, entitled DAYTIME RUNNING LIGHT CONTROL USING AN INTELLIGENT POWER MANAGEMENT SYSTEM; U.S. Ser. No. 10/258,441, filed Apr. 9, 2003, entitled CURRENT MEASURING CIRCUIT SUITED FOR BATTERIES; U.S. Ser. No. 10/681,666, filed Oct. 8, 2003, entitled ELECTRONIC BATTERY TESTER WITH PROBE LIGHT; U.S. Ser. No. 11/207,419, filed Aug. 19, 2005, entitled SYSTEM FOR AUTOMATICALLY GATHERING BATTERY INFORMATION FOR USE DURING BATTERY TESTER/CHARGING, U.S. Ser. No. 11/356,443, filed Feb. 16, 2006, entitled ELECTRONIC BATTERY TESTER WITH NETWORK COMMUNICATION; U.S. Ser. No. 12/697,485, filed Feb. 1, 2010, entitled ELECTRONIC BATTERY TESTER; U.S. Ser. No. 12/769,911, filed Apr. 29, 2010, entitled STATIONARY BATTERY TESTER; U.S. Ser. No. 13/098,661, filed May 2, 2011, entitled METHOD AND APPARATUS FOR MEASURING A PARAMETER OF A VEHICLE ELECTRICAL SYSTEM; U.S. Ser. No. 13/152,711, filed Jun. 3, 2011, entitled BATTERY PACK MAINTENANCE FOR ELECTRIC VEHICLE; U.S. Ser. No. 14/039,746, filed Sep. 27, 2013, entitled BATTERY PACK MAINTENANCE FOR ELECTRIC VEHICLE; U.S. Ser. No. 14/565,689, filed Dec. 10, 2014, entitled BATTERY TESTER AND BATTERY REGISTRATION TOOL; U.S. Ser. No. 15/017,887, filed Feb. 8, 2016, entitled METHOD AND APPARATUS FOR MEASURING A PARAMETER OF A VEHICLE ELECTRICAL SYSTEM; U.S. Ser. No. 15/049,483, filed Feb. 22, 2016, entitled BATTERY TESTER FOR ELECTRIC VEHICLE; U.S. Ser. No. 15/077,975, filed Mar. 23, 2016, entitled BATTERY MAINTENANCE SYSTEM; U.S. Ser. No. 15/149,579, filed May 9, 2016, entitled BATTERY TESTER FOR ELECTRIC VEHICLE; U.S. Ser. No. 15/791,772, field Oct. 24, 2017, entitled ELECTRICAL LOAD FOR ELECTRONIC BATTERY TESTER AND ELECTRONIC BATTERY TESTER INCLUDING SUCH ELECTRICAL LOAD; U.S. Ser. No. 16/021,538, filed Jun. 28, 2018, entitled BATTERY PACK MAINTENANCE FOR ELECTRIC VEHICLE; U.S. Ser. No. 16/056,991, filed Aug. 7, 2018, entitled HYBRID AND ELECTRIC VEHICLE BATTERY PACK MAINTENANCE DEVICE, U.S. Ser. No. 16/253,526, filed Jan. 22, 2019, entitled HIGH CAPACITY BATTERY BALANCER; U.S. Ser. No. 16/253,549, filed Jan. 22, 2019, entitled HYBRID AND ELECTRIC VEHICLE BATTERY PACK MAINTENANCE DEVICE;

U.S. Ser. No. 16/297,975, filed Mar. 11, 2019, entitled HIGH USE BATTERY PACK MAINTENANCE; U.S. Ser. No. 16/695,705, filed Nov. 26, 2019, entitled BATTERY RATING VERSUS OEM SPECIFICATION; U.S. Ser. No. 16/943,120, filed Jul. 30, 2020 entitled TIRE TREAD GAUGE USING VISUAL INDICATOR; U.S. Ser. No. 17/086,629, filed Nov. 2, 2020, entitled HYBRID AND ELECTRIC VEHICLE BATTERY PACK MAINTENANCE DEVICE; U.S. Ser. No. 147/088,824, filed Nov. 4, 2020, entitled SYSTEM FOR CHARGING A SERIES OF CONNECTED BATTERIES; U.S. Ser. No. 17/090,129, filed Nov. 5, 2020 entitled BATTERY PACK MAINTENANCE SYSTEM; all of which are incorporated herein by reference in their entireties.

What is claimed is:

1. A method of performing maintenance on a battery pack of a vehicle comprising:
   electrically connecting to a connector of the battery pack;
   measuring relative voltages between electrical connections of the connector of the battery pack;
   determining a virtual pin mapping of the electrical connections based upon the voltages; and
   performing maintenance on the battery pack based upon the determined virtual pin mapping.

2. The method of claim 1 wherein the maintenance comprises comparing voltages.

3. The method of claim 1 wherein the maintenance comprises charging the battery pack.

4. The method of claim 1 including identifying electrical connections to a temperature sensor based upon the measured relative voltages.

5. The method of claim 1 including applying a current to the temperature sensor and measuring a voltage drop indicative of temperature.

6. The method of claim 4 wherein the temperature sensor is arranged to sense a temperature of the battery pack.

7. The method of claim 4 including activating a switch based upon the identified electrical connections.

8. The method of claim 7 wherein the switch couples the temperature sensor to a current source.

9. The method of claim 1 including measuring a temperature of the battery pack using an infrared temperature sensor.

10. The method of claim 1 including reading information from a memory in a cable used to connect to the battery pack.

11. The method of claim 1 including receiving an input indicative of a type of the battery pack.

12. The method of claim 11 including identifying an incorrect cable used to connect to the battery pack based upon the input and the measured voltages.

* * * * *